(12) United States Patent
Bui et al.

(10) Patent No.: US 9,117,470 B1
(45) Date of Patent: Aug. 25, 2015

(54) WRITE DELAY TO DE-SKEW DATA IN READ WHILE WRITE FUNCTION FOR TAPE STORAGE DEVICES

(71) Applicant: International Business Machines Corporation, Armonk, NY (US)

(72) Inventors: Nhan X. Bui, Tucson, AZ (US); Tomoko Taketomi, Kanagawa (JP); Keisuke Tanaka, Machida (JP); Kazuhiro Tsuruta, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/334,395

(22) Filed: Jul. 17, 2014

(51) Int. Cl.
*G11B 5/00* (2006.01)
*G11B 5/56* (2006.01)
*G11B 20/20* (2006.01)
*G11B 5/584* (2006.01)
*G11B 5/48* (2006.01)

(52) U.S. Cl.
CPC ................ *G11B 5/56* (2013.01); *G11B 5/4893* (2013.01); *G11B 5/584* (2013.01); *G11B 20/20* (2013.01)

(58) Field of Classification Search
None
See application file for complete search history.

(56) References Cited

U.S. PATENT DOCUMENTS

| | | |
|---|---|---|
| 3,893,176 A | 7/1975 | Jones |
| 3,924,268 A | 12/1975 | McIntosh et al. |
| 3,943,566 A | 3/1976 | Brock et al. |
| 4,539,615 A | 9/1985 | Arai et al. |
| 4,752,846 A | 6/1988 | Proehl |
| 4,821,129 A | 4/1989 | Culp |
| 4,922,352 A | 5/1990 | Culp |
| 5,060,210 A | 10/1991 | Fennema et al. |
| 5,307,217 A | 4/1994 | Saliba |
| 5,371,638 A | 12/1994 | Saliba |
| 5,680,278 A | 10/1997 | Sawtelle, Jr. |
| 5,684,656 A | 11/1997 | Jung |
| 5,862,014 A | 1/1999 | Nute |
| 5,867,339 A | 2/1999 | Panish et al. |

(Continued)

FOREIGN PATENT DOCUMENTS

| | | |
|---|---|---|
| CN | 1920954 A | 2/2007 |
| CN | 101149931 A | 3/2008 |

(Continued)

OTHER PUBLICATIONS

Ditzel et al., "A Computer Method for the Automatic Reduction of Spectroscopic Data," Applied Optics, vol. 6, No. 12, Dec. 1967, pp. 2085-2090.

(Continued)

*Primary Examiner* — Thang Tran
(74) *Attorney, Agent, or Firm* — Zilka-Kotab, PC

(57) ABSTRACT

According to one general embodiment, a method includes determining an offset between first and second arrays of transducers on a magnetic head in a direction perpendicular to an intended direction of media travel when the magnetic head is positioned at a first position, tilting the magnetic head to a second position, and delaying writing by at least some of the write transducers to provide magnetic transitions on a magnetic medium as if the longitudinal axis of the array was aligned in the direction perpendicular to the intended direction of media travel. At least one of the arrays of transducers includes write transducers. Moreover, the arrays of transducers have longitudinal axes aligned at the second position greater or less than 0 degrees from the longitudinal axes of the arrays of transducers aligned at the first position.

20 Claims, 18 Drawing Sheets

(56) References Cited

U.S. PATENT DOCUMENTS

| | | | |
|---|---|---|---|
| 6,038,108 A | 3/2000 | Dee et al. | |
| 6,088,184 A | 7/2000 | Hu | |
| 6,130,804 A | 10/2000 | Panish et al. | |
| 6,188,532 B1 | 2/2001 | Albrecht et al. | |
| 6,188,535 B1 | 2/2001 | Lemke et al. | |
| 6,222,698 B1 | 4/2001 | Barndt et al. | |
| 6,275,350 B1* | 8/2001 | Barndt | 360/77.12 |
| 6,307,718 B1 | 10/2001 | Kasetty | |
| 6,339,793 B1 | 1/2002 | Bostian et al. | |
| 6,369,982 B2 | 4/2002 | Saliba | |
| 6,650,496 B2 | 11/2003 | Nozieres et al. | |
| 6,751,055 B1 | 6/2004 | Alfoqaha et al. | |
| 6,757,128 B2 | 6/2004 | Yip | |
| 6,781,784 B2 | 8/2004 | Peterson | |
| 6,947,247 B2 | 9/2005 | Schwarz et al. | |
| 7,009,812 B2 | 3/2006 | Hsu et al. | |
| 7,054,093 B1* | 5/2006 | Anderson et al. | 360/75 |
| 7,193,812 B2 | 3/2007 | Eaton | |
| 7,239,465 B1* | 7/2007 | Watson et al. | 360/55 |
| 7,253,986 B2 | 8/2007 | Berman et al. | |
| 7,342,738 B1* | 3/2008 | Anderson et al. | 360/77.12 |
| 7,428,120 B2 | 9/2008 | Berman et al. | |
| 7,474,488 B2 | 1/2009 | Czarnecki et al. | |
| 7,480,117 B2 | 1/2009 | Biskeborn et al. | |
| 7,486,464 B2 | 2/2009 | Saliba | |
| 7,681,793 B2 | 3/2010 | Biskeborn et al. | |
| 7,724,459 B2 | 5/2010 | Czarnecki et al. | |
| 7,764,460 B2 | 7/2010 | Bates et al. | |
| 7,766,236 B2 | 8/2010 | Biskeborn et al. | |
| 7,952,832 B2 | 5/2011 | Biskeborn et al. | |
| 8,045,290 B2* | 10/2011 | McKinstry et al. | 360/77.12 |
| 8,054,576 B2 | 11/2011 | Bui et al. | |
| 8,054,579 B2 | 11/2011 | Biskeborn | |
| 8,094,402 B2 | 1/2012 | Bui et al. | |
| 8,130,467 B2 | 3/2012 | Biskeborn et al. | |
| 8,265,487 B2 | 9/2012 | Schunk | |
| 8,587,902 B2 | 11/2013 | Biskeborn et al. | |
| 8,599,508 B1* | 12/2013 | Burd | 360/75 |
| 8,687,324 B2 | 4/2014 | Biskeborn et al. | |
| 8,797,682 B1* | 8/2014 | Biskeborn et al. | 360/121 |
| 8,810,957 B1* | 8/2014 | Biskeborn et al. | 360/85 |
| 8,902,528 B1 | 12/2014 | Biskeborn et al. | |
| 9,007,712 B1 | 4/2015 | Biskeborn et al. | |
| 2001/0015870 A1 | 8/2001 | Saliba | |
| 2002/0034042 A1 | 3/2002 | Hungerford et al. | |
| 2002/0163752 A1 | 11/2002 | Peterson | |
| 2002/0186496 A1 | 12/2002 | Saliba et al. | |
| 2005/0068671 A1 | 3/2005 | Hsu et al. | |
| 2005/0152067 A1 | 7/2005 | Yip et al. | |
| 2005/0157422 A1 | 7/2005 | Dugas et al. | |
| 2005/0168865 A1 | 8/2005 | Simmons et al. | |
| 2005/0259364 A1 | 11/2005 | Yip | |
| 2006/0039082 A1 | 2/2006 | Biskeborn et al. | |
| 2006/0126207 A1 | 6/2006 | Johnson et al. | |
| 2006/0126212 A1* | 6/2006 | Anderson et al. | 360/75 |
| 2006/0232884 A1 | 10/2006 | Biskeborn | |
| 2007/0047146 A1 | 3/2007 | Biskeborn et al. | |
| 2007/0242378 A1* | 10/2007 | Ikegami et al. | 360/39 |
| 2007/0285838 A1 | 12/2007 | Hennecken et al. | |
| 2008/0068750 A1 | 3/2008 | Biskeborn et al. | |
| 2008/0137235 A1 | 6/2008 | Biskeborn et al. | |
| 2008/0158720 A1 | 7/2008 | Watson | |
| 2008/0273258 A1 | 11/2008 | Berman et al. | |
| 2008/0285167 A1 | 11/2008 | Biskeborn et al. | |
| 2008/0291566 A1 | 11/2008 | Biskeborn et al. | |
| 2009/0027803 A1 | 1/2009 | Biskeborn et al. | |
| 2009/0128949 A1 | 5/2009 | Matsuno et al. | |
| 2009/0174963 A1* | 7/2009 | Liang et al. | 360/77.12 |
| 2009/0213493 A1 | 8/2009 | Bui et al. | |
| 2009/0219648 A1 | 9/2009 | Jaquette | |
| 2009/0231756 A1 | 9/2009 | Koeppe | |
| 2009/0231757 A1 | 9/2009 | Biskeborn et al. | |
| 2009/0279205 A1 | 11/2009 | Hennecken | |
| 2009/0316296 A1 | 12/2009 | Cherubini et al. | |
| 2010/0110587 A1 | 5/2010 | Biskeborn et al. | |
| 2011/0002065 A1 | 1/2011 | Dugas et al. | |
| 2011/0051283 A1 | 3/2011 | Harper et al. | |
| 2011/0170214 A1 | 7/2011 | Bui et al. | |
| 2011/0182157 A1* | 7/2011 | Hoerger | 369/41.01 |
| 2011/0199701 A1 | 8/2011 | Bui et al. | |
| 2011/0310511 A1 | 12/2011 | Edelman et al. | |
| 2012/0008234 A1 | 1/2012 | Biskeborn et al. | |
| 2012/0050909 A1 | 3/2012 | Lantz et al. | |
| 2012/0200952 A1 | 8/2012 | Bui et al. | |
| 2012/0206832 A1 | 8/2012 | Hamidi et al. | |
| 2013/0286502 A1* | 10/2013 | Erden et al. | 360/76 |
| 2014/0016226 A1 | 1/2014 | Bui et al. | |
| 2014/0036393 A1 | 2/2014 | Biskeborn et al. | |
| 2014/0153127 A1 | 6/2014 | Kawabe et al. | |
| 2014/0192435 A1 | 7/2014 | Buch | |
| 2014/0327983 A1 | 11/2014 | Biskeborn et al. | |
| 2014/0327984 A1 | 11/2014 | Biskeborn et al. | |
| 2014/0327987 A1 | 11/2014 | Biskeborn et al. | |
| 2014/0334033 A1 | 11/2014 | Biskeborn et al. | |

FOREIGN PATENT DOCUMENTS

| | | |
|---|---|---|
| CN | 101202050 A | 6/2008 |
| EP | 0478276 A2 | 4/1992 |
| EP | 0883120 A1 | 12/1998 |
| EP | 0959454 A2 | 11/1999 |
| EP | 1030300 A2 | 8/2000 |
| EP | 1204096 A2 | 5/2002 |
| GB | 1516045 | 6/1978 |
| JP | 2005108412 A | 4/2005 |
| JP | 2006172705 | 6/2006 |
| JP | 2008146818 A | 6/2008 |
| JP | 5043615 B2 | 10/2012 |
| KR | 0183774 B1 | 4/1999 |
| WO | WO2007093107 A1 | 8/2007 |
| WO | WO2009141231 A2 | 11/2009 |
| WO | WO2010047679 A1 | 4/2010 |
| WO | WO2011067052 A1 | 6/2011 |

OTHER PUBLICATIONS

U.S. Appl. No. 14/019,405, filed Sep. 5, 2013.
Notice of Allowance and Fee(s) Due from U.S. Appl. No. 14/019,405 dated Apr. 10, 2014.
Biskeborn et al., "2.4 Tape Head Technology," International Magnetic Tape Storage Roadmap, May 2012, pp. 107-128.
Argumedo et al., "Scaling tape-recording areal densities to 100 Gb/in2," 2008 IBM, IBM Journal of Research & Development, vol. 52, No. 4/5, Jul./Sep. 2008, pp. 513-527.
U.S. Appl. No. 14/316,696, filed Jun. 26, 2014.
Notice of Allowance from U.S. Appl. No. 14/316,696, dated Jul. 18, 2014.
Goldade et al., "Tape edge study in a linear tape drive with single-flanged guides," Journal of Magnetism and Magnetic Materials, vol. 271, 2004, pp. 409-430.
Beuch, W.E., "Magnetic Read Write Head Carriage Adjustment Procedure," IBM Technical Disclosure, IPCOM000071116D, Dec. 1, 1978, pp. 1-3.
Cherubini et al., "Control Methods in Data Storage Systems," IEEE Transactions on Control Systems Technology, vol. 20, Issue 2, Mar. 2012, pp. 296-322.
Wright, A. E., "Effects of Operating Parameters on Lateral Tape Motion for Magnetic Tape in an Advanced Linear Tape Drive," Thesis, Ohio State University, 2006, pp. 1-104.
Childers et al., "Six orders of magnitude in linear tape technology: The one-terabyte project," IBM Journal of Research & Development, vol. 47, No. 4, Jul. 2003, pp. 471-482.
Biskeborn et al., U.S. Appl. No. 13/875,231, filed May 1, 2013.
Biskeborn et al., U.S. Appl. No. 13/890,155, filed May 8, 2013.
Biskeborn et al., U.S. Appl. No. 13/972,790, filed Aug. 21, 2013.
Biskeborn et al., U.S. Appl. No. 14/028,444, filed Sep. 16, 2013.
Biskeborn et al., U.S. Appl. No. 14/105,082, filed Dec. 12, 2013.
Biskeborn et al., U.S. Appl. No. 14/108,229, filed Dec. 16, 2013.
Biskeborn et al., U.S. Appl. No. 13/875,230, filed May 1, 2013.
Biskeborn et al., U.S. Appl. No. 13/875,226, filed May 1, 2013.

(56) References Cited

OTHER PUBLICATIONS

Non-Final Office Action from U.S. Appl. No. 13/875,226, dated Sep. 15, 2014.
Requirement for Restriction from U.S. Appl. No. 13/875,226, dated Jun. 26, 2014.
Non-Final Office Action from U.S. Appl. No. 13/875,230, dated Sep. 18, 2014.
Non-Final Office Action from U.S. Appl. No. 13/875,231, dated Sep. 16, 2014.
Requirement for Restriction from U.S. Appl. No. 13/875,231, dated Jul. 22, 2014.
Non-Final Office Action from U.S. Appl. No. 13/890,155, dated Oct. 23, 2014.
Requirement for Restriction from U.S. Appl. No. 13/890,155, dated Jun. 25, 2014.
Notice of Allowance from U.S. Appl. No. 13/972,790, dated Mar. 20, 2014.
Supplemental Notice of Allowability from U.S. Appl. No. 14/019,405, dated Jul. 14, 2014.
Supplemental Notice of Allowability from U.S. Appl. No. 14/316,696, dated Sep. 4, 2014.
Supplemental Notice of Allowability from U.S. Appl. No. 14/316,696, dated Sep. 26, 2014.
Supplemental Notice of Allowability from U.S. Appl. No. 14/316,696, dated Oct. 23, 2014.
Biskeborn et al., U.S. Appl. No. 14/527,722, filed Oct. 29, 2014.
Requirement for Restriction from U.S. Appl. No. 14/028,444, dated Oct. 9, 2014.
Notice of Allowance from U.S. Appl. No. 14/108,229, dated Dec. 4, 2014.
Requirement for Restriction from U.S. Appl. No. 13/875,230, dated Jul. 10, 2014.
Bui et al., U.S. Appl. No. 14/574,278, filed Dec. 17, 2014.
International Search Report and Written Opinion from PCT Application No. PCT/IB2014/060706, dated Jan. 21, 2015.
Notice of Allowance from U.S. Appl. No. 14/645,350, dated Apr. 16, 2015.
Non-Final Office Action from U.S. Appl. No. 14/574,278, dated May 15, 2015.

* cited by examiner

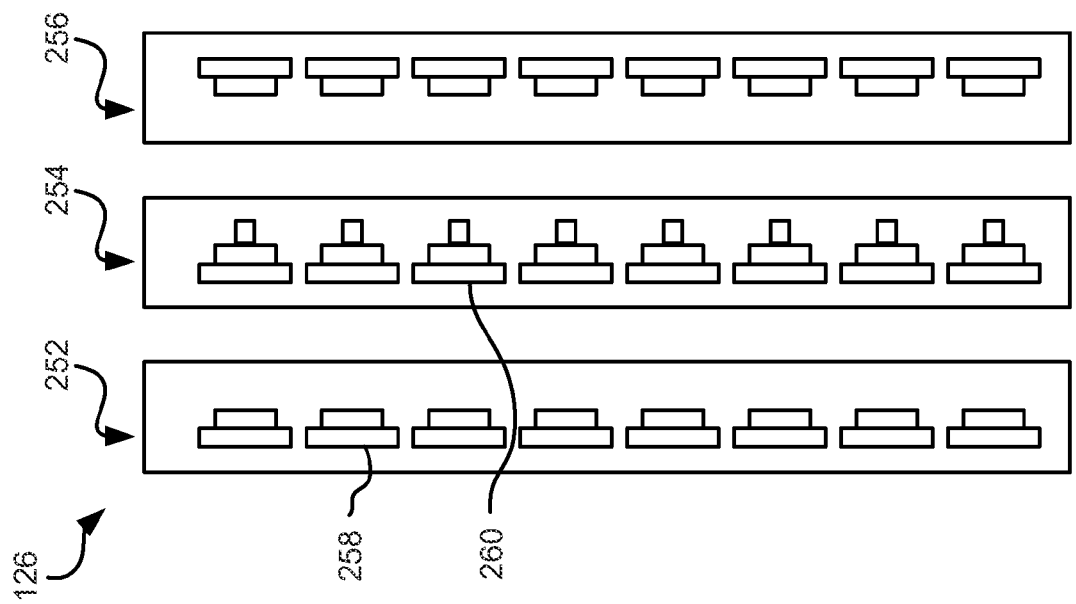
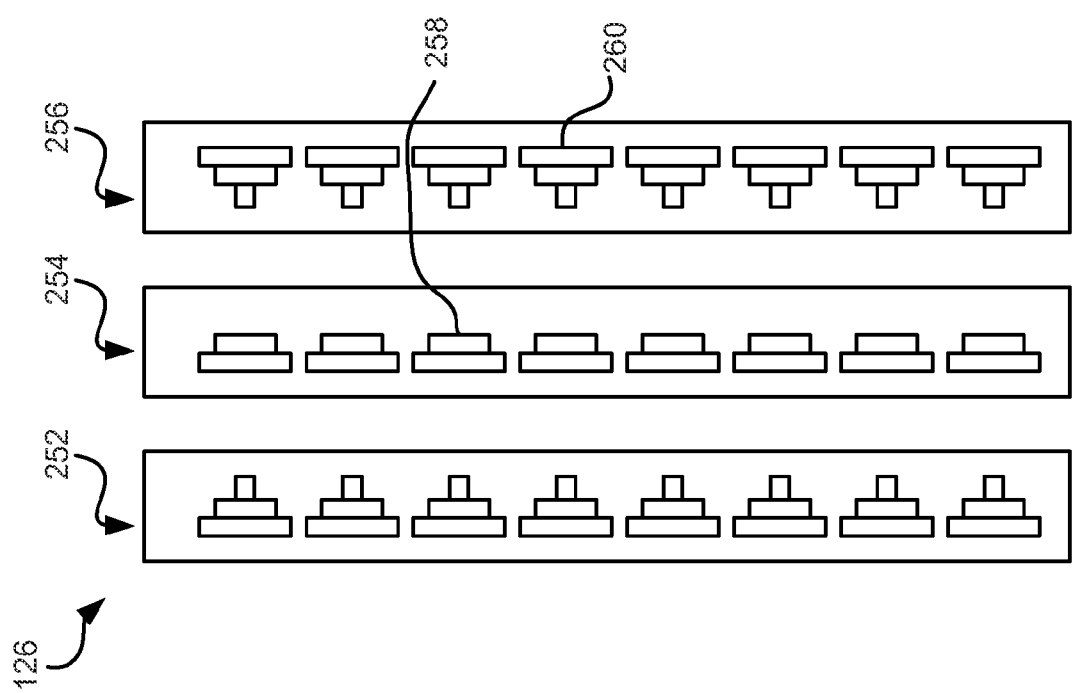

WRITE DELAY TO DE-SKEW DATA IN READ WHILE WRITE FUNCTION FOR TAPE STORAGE DEVICES

BACKGROUND

The present invention relates to data storage systems, and more particularly, this invention relates to tape storage devices implementing wright delays to compensate for offset between transducer arrays.

In magnetic storage systems, data is read from and written onto magnetic recording media utilizing magnetic transducers. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, magnetic tape is moved over the surface of the tape head at high speed. Usually the tape head is designed to minimize the spacing between the head and the tape. The spacing between the magnetic head and the magnetic tape is crucial so that the recording gaps of the transducers, which are the source of the magnetic recording flux, are in near contact with the tape to effect writing sharp transitions, and so that the read element is in near contact with the tape to provide effective coupling of the magnetic field from the tape to the read element.

The quantity of data stored on a magnetic tape may be increased by increasing the number of data tracks across the tape. More tracks are made possible by reducing feature sizes of the readers and writers, such as by using thin-film fabrication techniques and MR sensors. However, for various reasons, the feature sizes of readers and writers cannot be arbitrarily reduced, and so factors such as misalignment between transducers in the intended direction of tape travel must be balanced with read/write operations that provide acceptable written tracks and readback signals.

BRIEF SUMMARY

A method, according to one embodiment, includes determining an offset between first and second arrays of transducers on a magnetic head in a direction perpendicular to an intended direction of media travel when the magnetic head is positioned at a first position, tilting the magnetic head to a second position, and delaying writing by at least some of the write transducers to provide magnetic transitions on a magnetic medium as if the longitudinal axis of the array was aligned in the direction perpendicular to the intended direction of media travel. At least one of the arrays of transducers includes write transducers. Moreover, the arrays of transducers have longitudinal axes aligned at the second position greater or less than 0 degrees from the longitudinal axes of the arrays of transducers aligned at the first position.

An apparatus, according to another embodiment, includes a magnetic head having at least two modules, each of the modules having an array of transducers. Moreover, a longitudinal axis of each of the arrays are oriented about parallel to each other. The apparatus further includes a controller configured to: determine an offset between adjacent ones of the arrays of transducers in a direction perpendicular to an intended direction of media travel when the magnetic head is positioned at a first position, tilt the magnetic head to a second position, and delay write operations performed by at least some of the transducers in an array of a first of the modules such that data written by the transducers in the array of the first of the modules is readable by an array of read transducers aligned in the direction orthogonal to the intended direction of media travel without implementing readback delays corresponding to the write delays. The delay in write operations performed is based at least in part on an offset between the arrays of transducers in a direction orthogonal to an intended direction of media travel.

A computer program product, according to yet another embodiment, includes a computer readable storage medium having program instructions embodied therewith, the program instructions readable and/or executable by a device to cause the device to: determine an offset between first and second arrays of transducers on a magnetic head in a direction perpendicular to an intended direction of media travel when the magnetic head is positioned at a first position, tilt the magnetic head to a second position, and delay writing by at least some of the write transducers to provide magnetic transitions on a magnetic medium as if the longitudinal axis of the array was aligned in the direction perpendicular to the intended direction of media travel. At least one of the arrays of transducers includes write transducers. Moreover, the arrays of transducers have longitudinal axes aligned at the second position greater or less than 0 degrees from the longitudinal axes of the arrays of transducers aligned at the first position.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIG. 3 is a partial tape bearing surface view of a magnetic head having a write-read-write configuration.

FIG. 4 is a partial tape bearing surface view of a magnetic head having a read-write-read configuration.

DETAILED DESCRIPTION

Figure 1A:
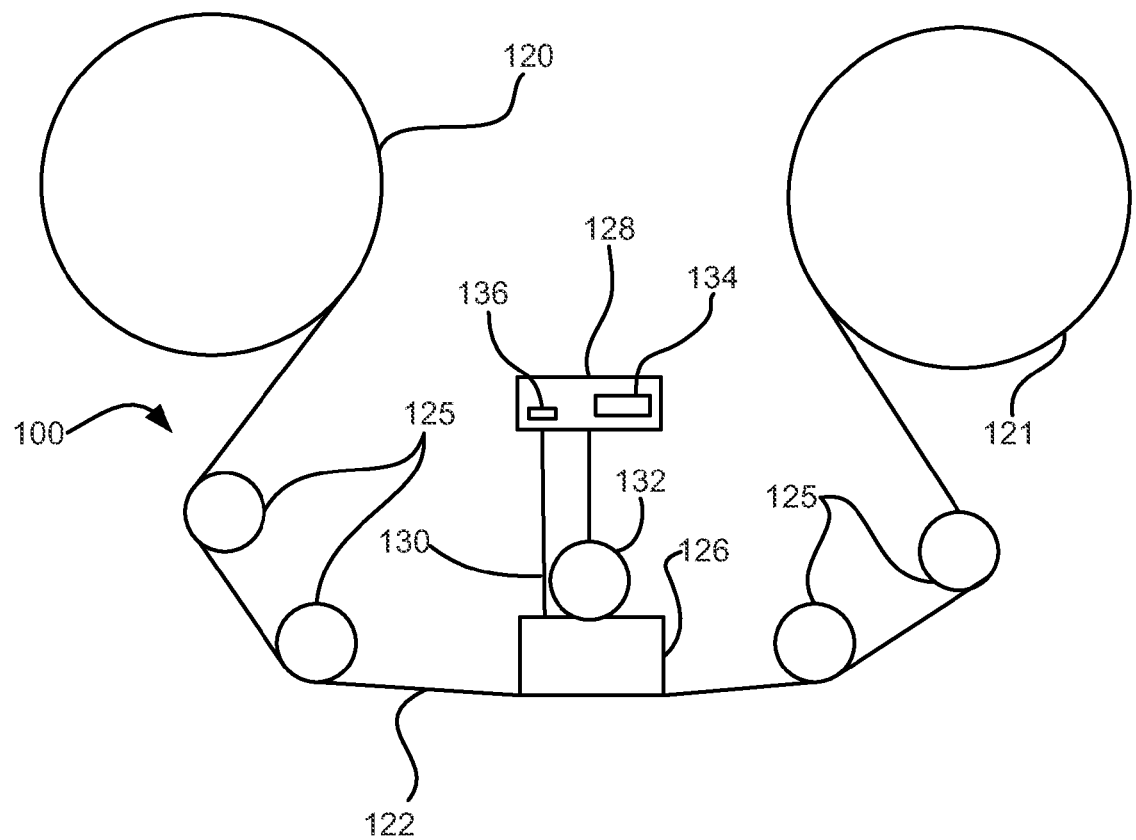
FIG. 1A is a schematic diagram of a simplified tape drive system according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof. Various embodiments described herein include the ability to provide a write delay to de-skew data written by a tilted head such that magnetic transitions are written to a magnetic medium as if the longitudinal axis of the array performing the associated write operation was aligned in the direction perpendicular to the intended direction of media travel, as will be described in further detail below. Additionally, by selectively tilting arrays of such transducers, preferred embodiments described herein are able to compensate for tape dimensional instability while reading from and/or writing to tape.

According to one general embodiment, a method includes determining an offset between first and second arrays of transducers on a magnetic head in a direction perpendicular to an intended direction of media travel when the magnetic head is positioned at a first position, tilting the magnetic head to a second position, and delaying writing by at least some of the write transducers to provide magnetic transitions on a magnetic medium as if the longitudinal axis of the array was aligned in the direction perpendicular to the intended direction of media travel. At least one of the arrays of transducers includes write transducers. Moreover, the arrays of transducers have longitudinal axes aligned at the second position greater or less than 0 degrees from the longitudinal axes of the arrays of transducers aligned at the first position.

According to another general embodiment, an apparatus includes a magnetic head having at least two modules, each of the modules having an array of transducers. Moreover, a longitudinal axis of each of the arrays are oriented about parallel to each other. The apparatus further includes a controller configured to: determine an offset between adjacent ones of the arrays of transducers in a direction perpendicular to an intended direction of media travel when the magnetic head is positioned at a first position, tilt the magnetic head to a second position, and delay write operations performed by at least some of the transducers in an array of a first of the modules such that data written by the transducers in the array of the first of the modules is readable by an array of read transducers aligned in the direction orthogonal to the intended direction of media travel without implementing readback delays corresponding to the write delays. The delay in write operations performed is based at least in part on an offset between the arrays of transducers in a direction orthogonal to an intended direction of media travel.

According to yet another general embodiment, a computer program product includes a computer readable storage medium having program instructions embodied therewith, the program instructions readable and/or executable by a device to cause the device to: determine an offset between first and second arrays of transducers on a magnetic head in a direction perpendicular to an intended direction of media travel when the magnetic head is positioned at a first position, tilt the magnetic head to a second position, and delay writing by at least some of the write transducers to provide magnetic transitions on a magnetic medium as if the longitudinal axis of the array was aligned in the direction perpendicular to the intended direction of media travel. At least one of the arrays of transducers includes write transducers. Moreover, the arrays of transducers have longitudinal axes aligned at the second position greater or less than 0 degrees from the longitudinal axes of the arrays of transducers aligned at the first position.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may operate under logic known in the art, as well as any logic disclosed herein. The controller 128 may be coupled to a memory 136 of any known type, which may store instructions executable by the controller 128. Moreover, the controller 128 may be configured and/or programmable to perform or control some or all of the methodology presented herein. Thus, the controller may be considered configured to perform various operations by way of logic programmed into a chip; software, firmware, or other instructions being available to a processor; etc. and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (integral or external) to send and receive the data and for controlling the operation of the tape drive 100 and communicating the status of the tape drive 100 to the host, all as will be understood by those of skill in the art.

Figure 1B:
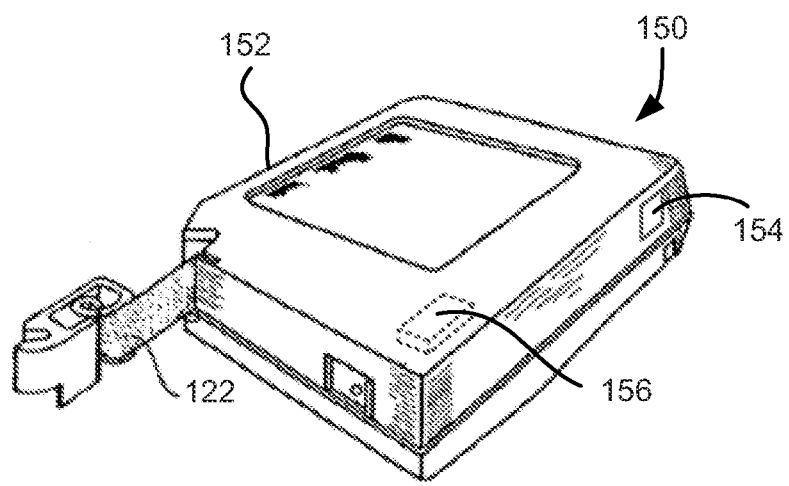
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some embodiments, the nonvolatile memory 156 may be embedded inside the housing 152, as shown in FIG. 1B. In more embodiments, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
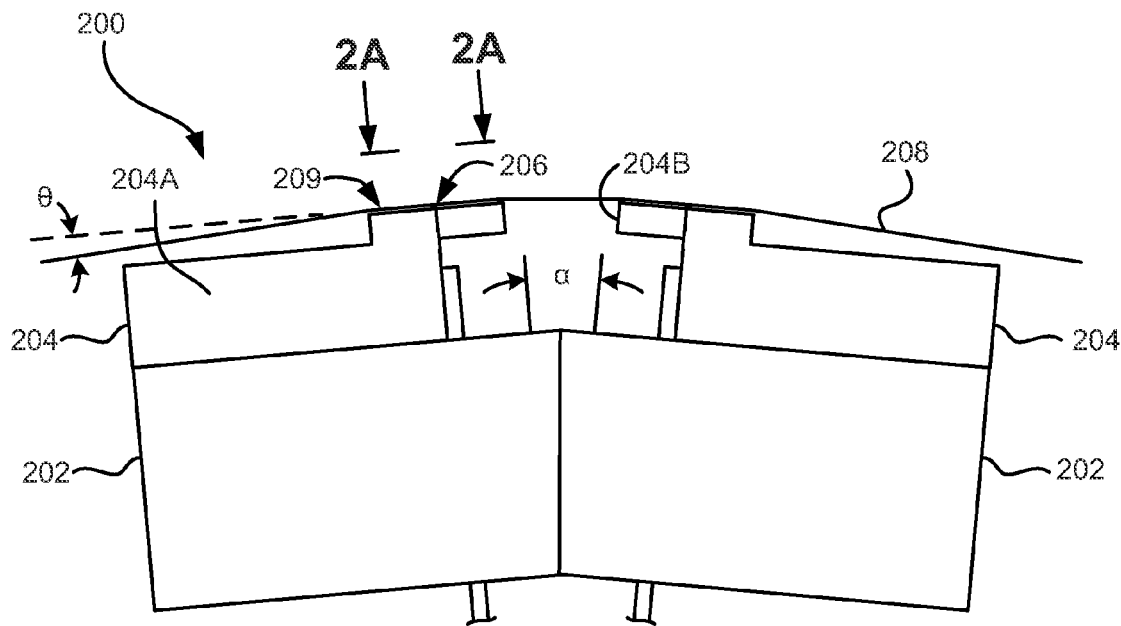
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 5 degrees.

The substrates 204A are typically constructed of a wear resistant material, such as a ceramic. The closures 204B made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
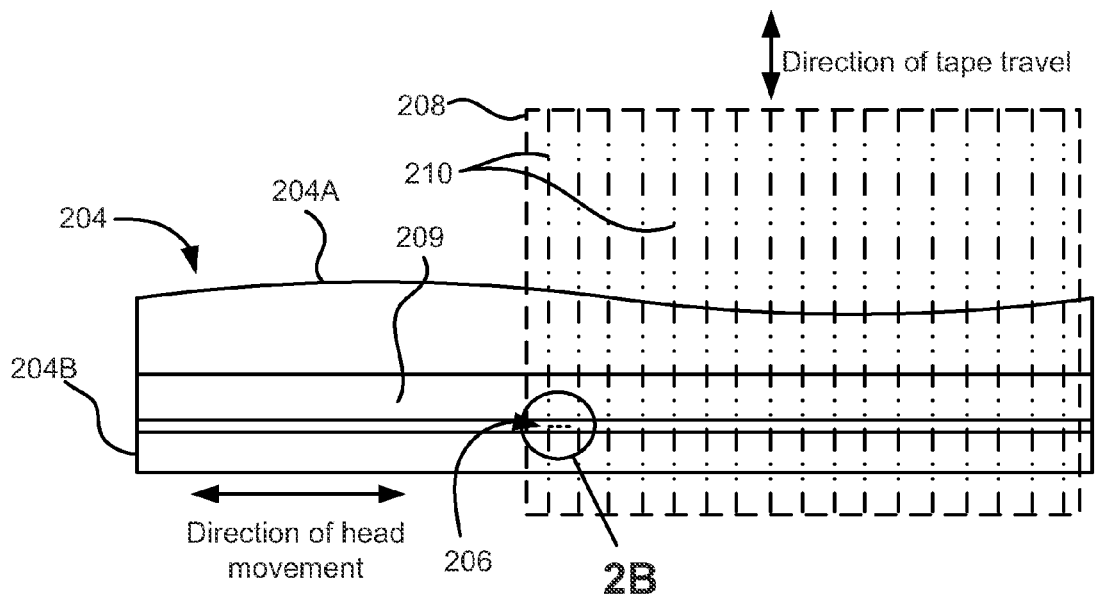
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 22 data bands, e.g., with 8 data bands and 9 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
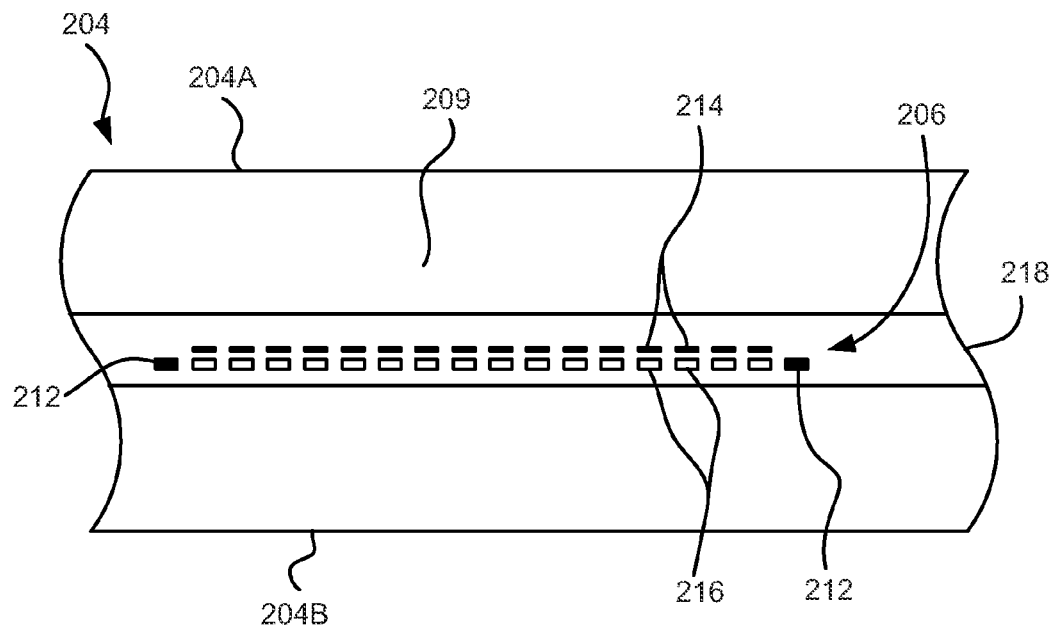
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
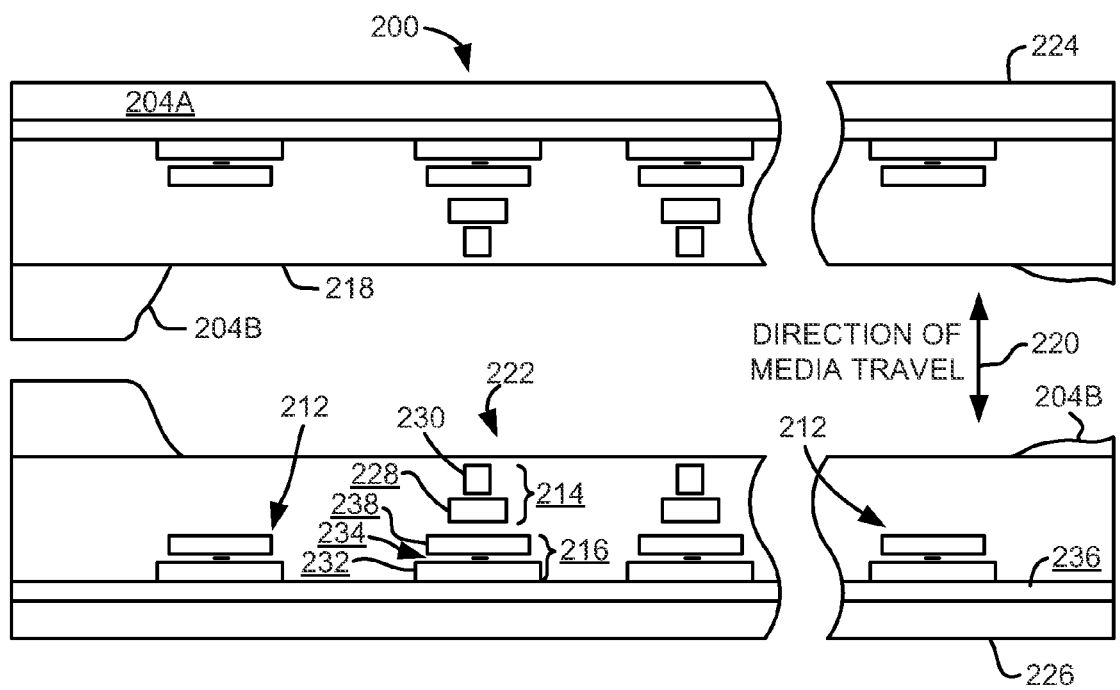
FIG. 2C is a detailed view of a partial tape bearing surface of a pair of modules.

FIG. 2C shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the writes 214 and the readers, exemplified by the read head 216, are aligned parallel to a direction of travel of a tape medium thereacross to form an R/W pair, exemplified by the R/W pair 222.

Several R/W pairs 222 may be present, such as 8, 16, 32 pairs, etc. The R/W pairs 222 as shown are linearly aligned in a direction generally perpendicular to an intended direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the intended direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (–), CZT or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further embodiments, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
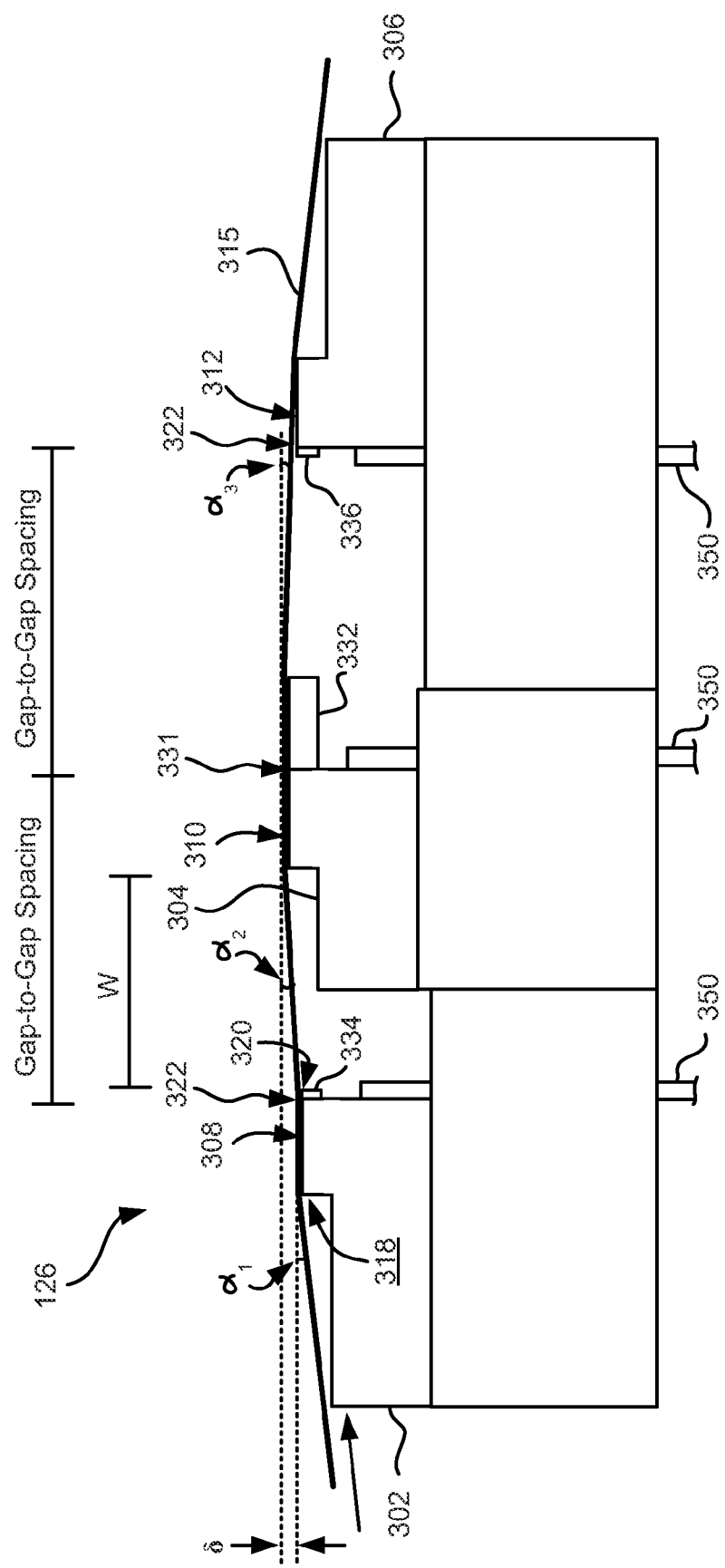
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules.

Also note that the outer modules 302, 306 will alternate as leading modules, depending on the direction of travel of the tape 315.

Figure 6:
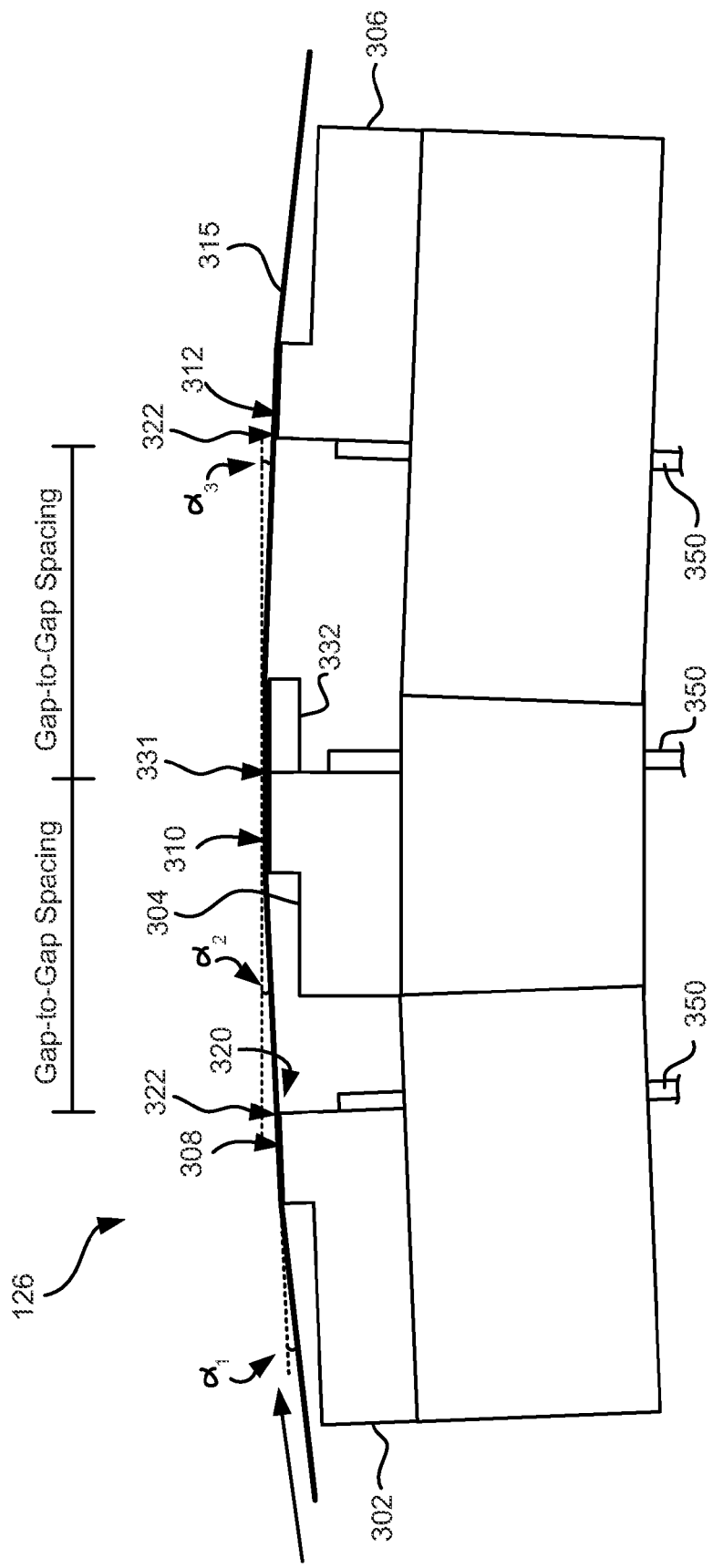
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.5° to about 1.1°, though can be any angle required by the design.

Beneficially, the inner wrap angle $\alpha_2$ may be set slightly less on the side of the module 304 receiving the tape (leading edge) than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 25-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to an intended direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than standard LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
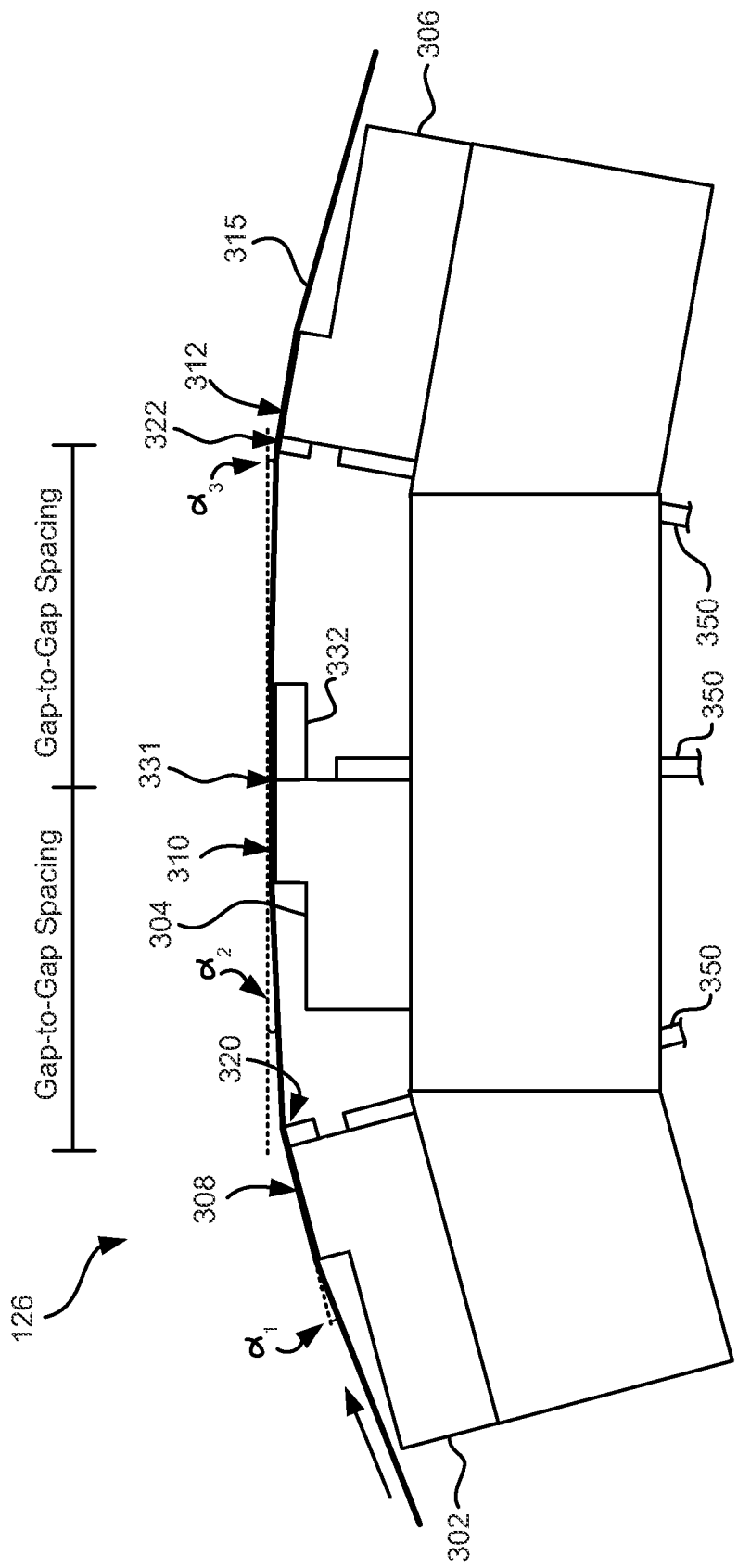
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures will force a wider gap-to-gap separation. Therefore a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same pitch as current 16 channel piggyback LTO modules, or alternatively the connections on the module may be organ-keyboarded for a 50% reduction in cable span. Over-under, writing pair unshielded cables can be used for the writers, which may have integrated servo readers.

The outer wrap angles $\alpha_1$ may be set in the drive, such as by guides of any type known in the art, such as adjustable rollers, slides, etc. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head can be maintained or even reduced relative to heads of previous generations. In other embodiments, the modules may be constructed as a unitary body. Those skilled in the art, armed with the present teachings, will appreciate that other known methods of manufacturing such heads may be adapted for use in constructing such heads.

As noted above, the quantity of data stored on a magnetic tape may be increased by increasing the number of data tracks across the tape. More tracks are made possible by reducing feature sizes of the readers and writers, such as by using thin-film fabrication techniques and MR sensors. However, for various reasons, the feature sizes of readers and writers cannot be arbitrarily reduced, and so factors such as misalignment between transducers in the intended direction of tape travel must be balanced with read/write operations that provide acceptable written tracks and readback signals.

One issue limiting areal density is misregistration caused by unintended offset between transducers in arrays of adjacent modules, the offset being in a direction perpendicular to the intended direction of tape travel. These unintended offsets may result from manufacturing defects and have a significant effect on the performance of the heads implementing these inadvertently-offset transducer arrays. Specifically, for conventional products, an array of read transducers offset from an array of write transducers in a direction perpendicular to the intended direction of tape travel is unable to read verify the data tracks being written by the write transducers. Moreover, as tape capacity increases over time, tracks are becoming smaller and offset between transducers of adjacent transducer arrays is becoming an increasingly larger portion of the tracking budget and this is a limiting factor for growing areal density. For example, even an offset of a few microns between transducers of adjacent arrays undesirably result in conventional products becoming unable to perform read while write verification.

Thus, it would be desirable to develop a tape drive system able to read and/or write tracks onto the tape in the proper position, regardless of the extent of offset between transducers of adjacent arrays. Various embodiments described and/or suggested herein overcome the foregoing challenges of conventional products by orienting the transducer arrays such that any offset therebetween is mitigated, such as by rotating, pivoting and/or tilting, thereby selectively altering the orientation of the transducers of each array relative to other arrays. Moreover, the arrays of transducers may implement write delays, e.g., to enable non-tilted readback, as will soon become apparent.

Figure 8A:
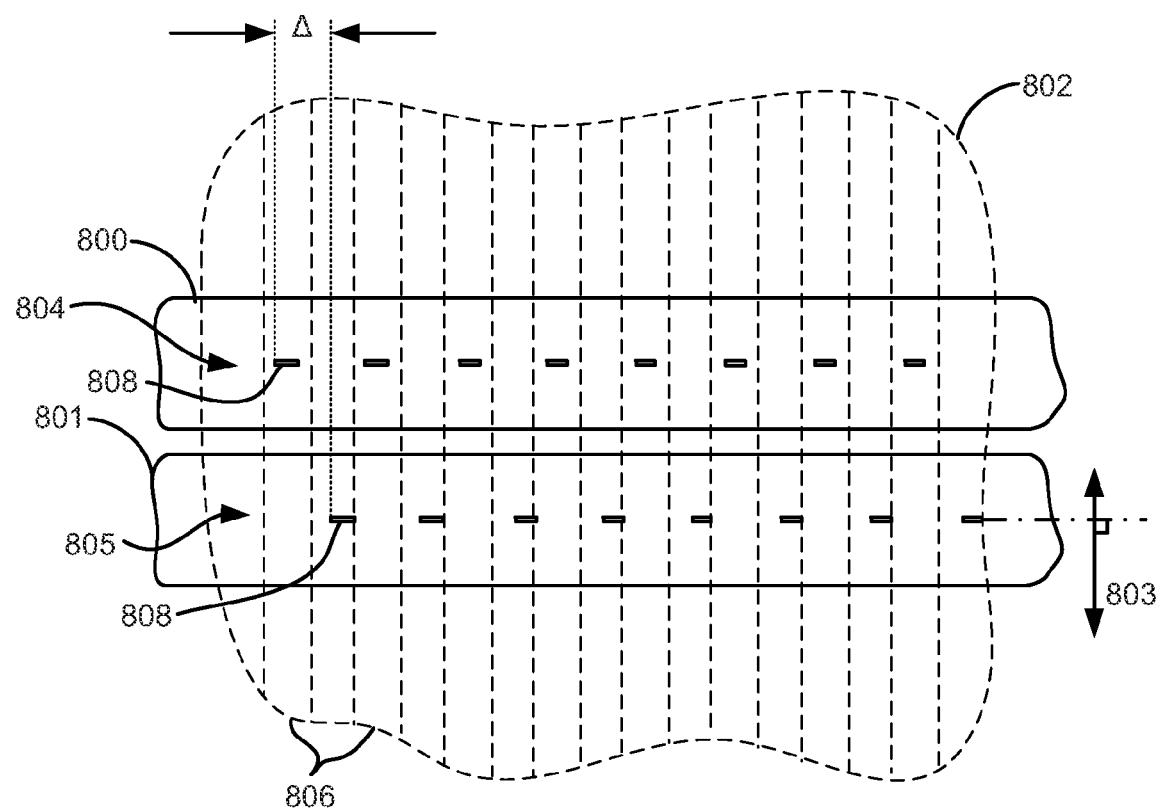
FIGS. 8A-8B are partial top-down views of two modules of a magnetic tape head according to one embodiment.
Figure 8B:
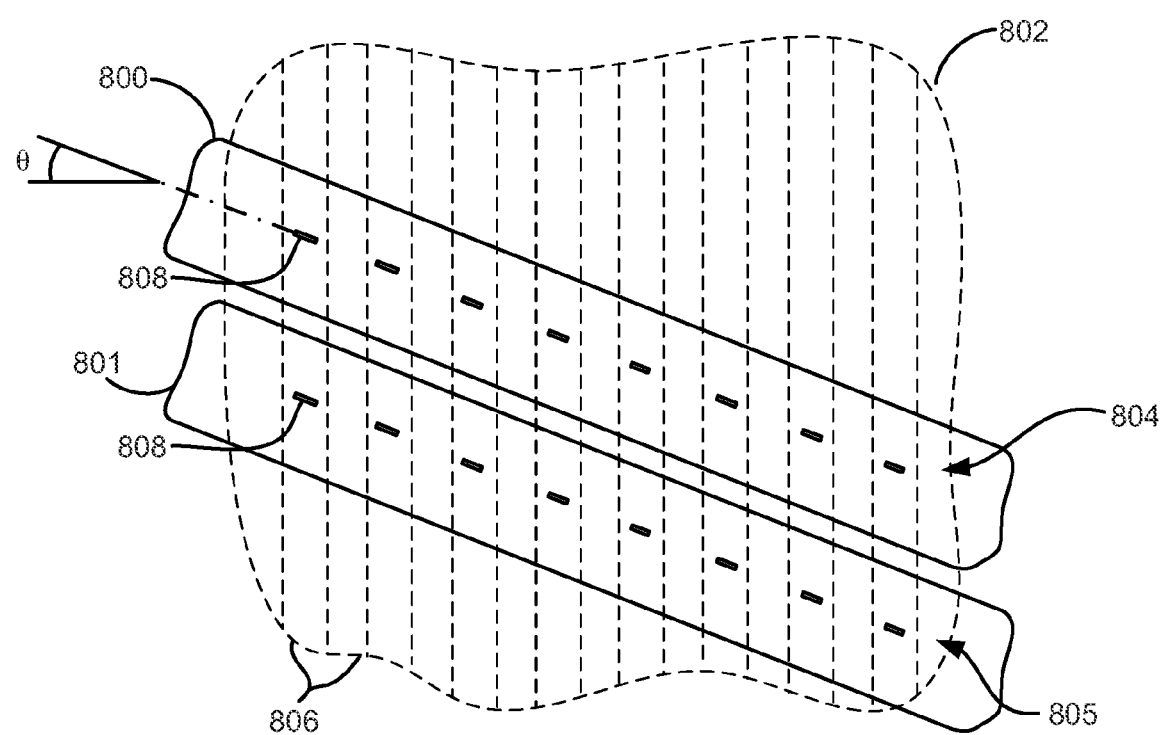

By selectively orienting an array of transducers, the effective position of the transducers relative to those of an adjacent array of transducers is thereby altered. FIGS. 8A-8B illustrate representational views of the effects of orienting a pair of misaligned transducer arrays to align them in the direction of tape travel thereacross. It should be noted that the angles of orientation illustrated in FIGS. 8A-8B are an exaggeration (e.g., larger than would typically be observed), and are in no way intended to limit the invention. Moreover, although it is preferred that a first of the transducer arrays 804, 805 includes write transducers while a second of the transducer arrays 804, 805 includes read transducers, the transducers 808 of the arrays 804, 805 may include any configuration depending on the desired embodiment.

Referring to FIG. 8A, first and second modules 800, 801 having first and second arrays 804, 805 of transducers respectively, are shown positioned in a first position relative to the tape 802. Moreover, the modules 800, 801, are preferably fixed to each other such that the longitudinal axes of arrays 804, 805 are oriented about parallel to each other, respectively.

As illustrated, modules 800, 801 are oriented substantially perpendicular to the intended direction of tape travel 803. Although the first position corresponds to a direction perpendicular to the intended direction of tape travel 803 for the present embodiment, in other embodiments the first position may correspond to any other direction relative to the intended direction of tape travel 803, e.g., rotated 5 degrees from being oriented in a direction perpendicular to the intended direction of tape travel 803.

Looking still to FIG. 8A, it is also apparent that there is an offset Δ between the transducers 808 of the first and second arrays 804, 805. This offset is typically a result of manufacturing imperfections, e.g., as a result of the inability to perfectly align the arrays when coupling the modules together. As a result, the transducers 808 of the first array 804 are not favorably aligned with the transducers 808 of the second array 805, e.g., along the data tracks 806 on the tape 802. According to an example, if the transducers of the first array 804 are readers and the transducers of the second array 805 are writers, the offset Δ therebetween may preclude the ability to perform read verification while data is being written to the data tracks by the write transducers of the second array 805.

However, referring now to FIG. 8B, the modules 800, 801 have been rotated and are now positioned in a second position such that the undesirable offset Δ of FIG. 8A has been mitigated. Therefore, the transducers 808 of the first array 804 are now aligned with the transducers of the second array 805. Moreover, the arrays 804, 805 have been rotated in such a way that the transducers of the first and second arrays 804, 805 are aligned in the data tracks 806, e.g., thereby enabling read while write verification for the embodiment having one or more write transducers in a first of the arrays and one or more read transducers in a second of the arrays. Smaller angular adjustments may also be made to the already-oriented modules 800, 801, e.g. in order to compensate for changes during operation. Therefore, referring still to FIG. 8B, the angle of orientation θ of the modules 800, 801 may be tuned to further adjust the orientation of the transducer arrays 804, 805 relative to each other and/or relative to the data tracks 806 on the tape 802, as adjusting the angle of orientation θ also translates to a reduction in the effective pitch between the transducers of the arrays.

It is preferred that the offset between transducer arrays be determined and compensated for prior to performing read and/or write operations on user data. Moreover, once the offset has been determined (e.g., measured, calculated, derived, etc.), it is preferred that the offset be stored in memory such that it is accessible during future operations. As previously mentioned, the offset between transducers of adjacent transducer arrays are commonly the result of manufacturing errors. Therefore by determining and compensating for any offset for a given head prior to performing read and/or write operations, the offset may be mitigated for any subsequent operation requests, thereby reducing write errors and/or readback errors. However, the orientation and/or dimensions of a tape may change during run time. For example, tape skew may cause the angular orientation of the tape relative to the transducer arrays 804, 805 to shift, thereby causing the orientation of the data tracks 806 on the tape 802 to shift and effectively cause the transducers 808 to become offset relative to the data tracks 806. As a result, the transducers 808 of the arrays 804, 805 would no longer be aligned with each other, much less the data tracks 806 on the tape 802 if no additional adjustments were made.

It follows that, in some embodiments, the position at which the arrays 804, 805 are oriented may be selectable, and in some approaches continuously or periodically adjusted during run time, based at least in part on any desirable factor. In one approach, the extent of the angular orientation of the longitudinal axes of transducer arrays 804, 805 may be made based on an extent of tape skew to compensate for a fluctuating orientation of the tape with respect to the transducer arrays 804, 805. Therefore, by selectively adjusting the position of the modules 800, 801, various embodiments described herein may desirably be able to compensate for tape lateral expansion, tape lateral contraction, tape skew, etc.

Figure 12:
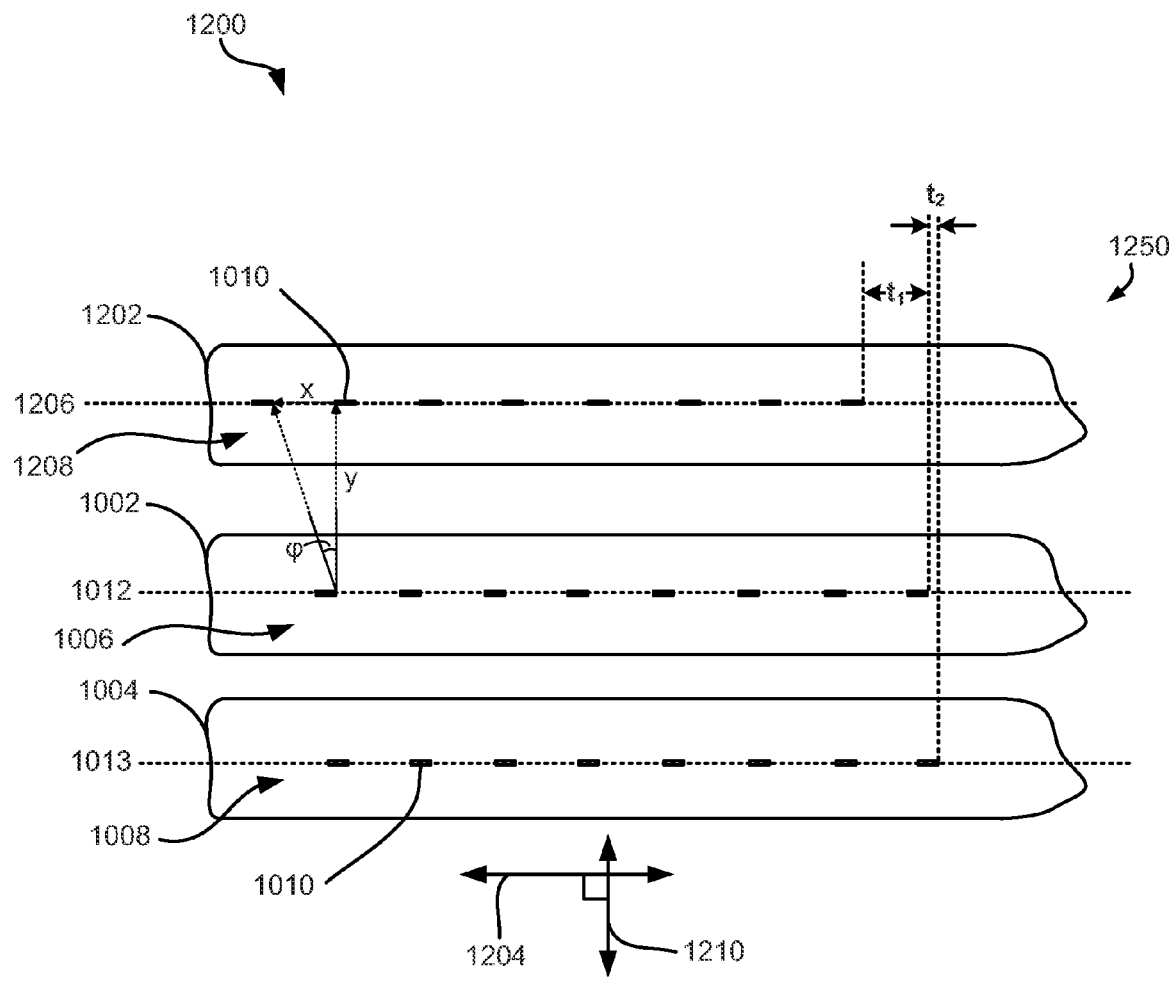
FIG. 12 is a partial top-down view of a magnetic head with three modules according to one embodiment.

Moreover, although the present embodiment illustrated in FIGS. 8A-8B includes two modules and two transducer arrays associated therewith, alternate embodiments may include additional transducer arrays and/or additional modules. For example. FIG. 12 includes three transducer arrays, each of which is positioned on a respective module. Therefore, in some embodiments it may be desirable to determine an offset between a first and second array of transducers in addition to an offset between the second array and a third array of transducers, as will be described in further detail below.

Figure 9:
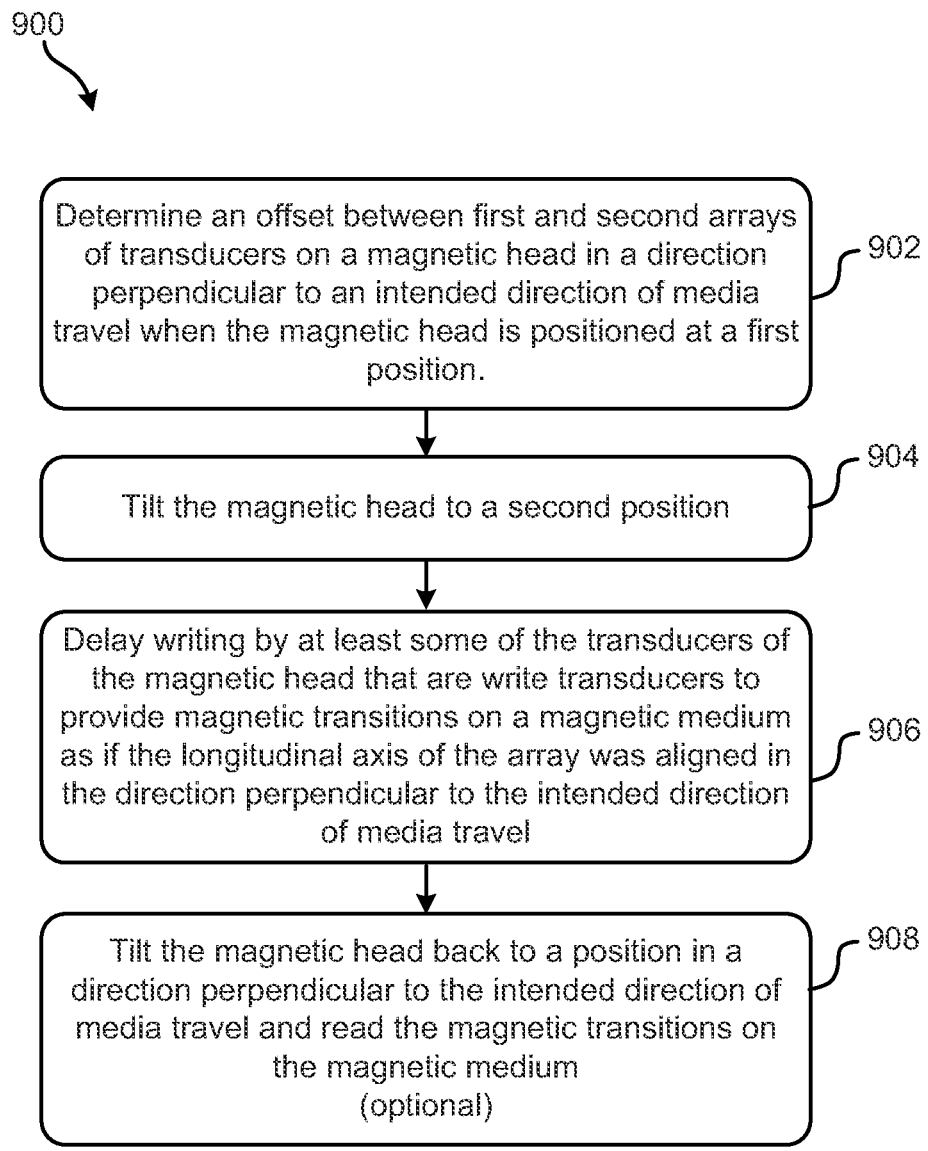
FIG. 9 is a flow chart for a method according to one embodiment.

FIG. 9 illustrates the process flow of a method 900 for overcoming an offset between transducers, in accordance with one embodiment. As an option, the present method 900 may be implemented in conjunction with features from any other embodiment listed herein, such as those described with reference to the other FIGS., such as FIGS. 8A-8B. Of course, however, method 900 and others presented herein may be used in various applications and/or in permutations which may or may not be specifically described in the illustrative embodiments listed herein. Further, the method 900 presented herein may be used in any desired environment. Thus FIG. 9 (and the other FIGS.) should be deemed to include any and all possible permutations.

Looking now to FIG. 9, method 900 includes determining an offset between first and second arrays of transducers on a magnetic head in a direction perpendicular to an intended direction of media travel when the magnetic head is positioned at a first position. See operation 902. According to some approaches, the offset may be determined by calculating the offset, e.g., using physical measurements, performance readings, etc. However, in other approaches, the offset may have been previously calculated and stored in memory, e.g., in a tape drive performing method 900, such that "determining an offset" as included in operation 902 may amount to simply looking up the stored value. Thus, in various approaches, the offset may be stored in memory, e.g., for future access.

Furthermore, operation 904 of method 900 includes tilting the magnetic head to a second position, e.g., based at least in part on the offset determined in operation 902. According to an exemplary use embodiment, the magnetic head may be tilted to the second position to compensate for misalignment between transducers of adjacent transducer arrays, e.g., see Δ of FIG. 8A. Upon tilting the magnetic head to the second position, the previously misaligned (e.g., offset) transducers are preferably aligned in an intended direction of tape travel, e.g., as illustrated in FIG. 8B. In other words, the offset between transducers of the adjacent transducer arrays in a direction perpendicular to the intended direction of tape travel is mitigated. According to an exemplary embodiment, which is in no way intended to limit the invention, to achieve alignment between transducers of different arrays, the skew servo may implement the Skew Error Signal left to right (SESlr) as a feedback signal, as would be appreciated by one skilled in the art upon reading the present description.

With continued reference to method 900 of FIG. 9, operation 906 includes delaying writing by at least some of the transducers of the magnetic head that are write transducers to provide magnetic transitions on a magnetic medium as if the longitudinal axis of the array was aligned in the direction perpendicular to the intended direction of media travel during writing. Thus, according to one approach, the magnetic transitions may be readable by an array of read transducers aligned in the direction orthogonal to the intended direction of media travel without implementing readback delays corresponding to the writing delays. To better understand this characteristic, reference is made momentarily to FIG. 11, in which, by offsetting the operation of the transducers 1010, corresponding data transitions 1110, 1110 and 1120, 1120 respectively, written to the tape may align substantially in a crosstrack direction orthogonal to the intended direction 1020 of tape travel, e.g., corresponding with a format. Therefore, although the axes 1012, 1013 of the arrays 1106, 1108 may be oriented at about a second position having an angle ϕ, corresponding data transitions 1110, 1110 and 1120, 1120 respectively, may be aligned in the crosstrack direction, and optionally read back using a head that has non-tilted arrays, or with the same head without tilting. In other words, a delayed (e.g., de-skew) write operation may be performed such that the data from a write transducer is delayed with respect to the subsequent write transducer of the array in an amount that would preferably cancel out the angle ϕ at which the head is oriented.

Referring again to method 900 of FIG. 9, although the magnetic head is positioned (e.g., tilted) at a second position when performing the delayed writing, according to an exemplary embodiment the magnetic head may be tilted back to a position in a direction perpendicular to the intended direction of media travel to perform read operations. As mentioned above, the delayed writing preferably provides magnetic transitions on a magnetic medium as if the longitudinal axis of the transducer array performing the data writes was aligned in the direction perpendicular to the intended direction of media travel. In other words, the magnetic transitions are positioned such that the data written is readable by an array of read transducers aligned in the direction orthogonal to the intended direction of media travel without implementing readback delays corresponding to the write delays (e.g., see FIG. 1). Thus, by tilting the magnetic head back to a position in a direction perpendicular to the intended direction of media travel, read transducers of the magnetic head are able to perform read operations (e.g., see optional operation 908 of FIG. 9).

This functionality may also be beneficial by enabling a drive to accurately read data in a drive different from the drive in which the data was written, which may have had a different transducer configuration and/or orientation. In some approaches, Skew Error Signal top to bottom (SEStb) may be used as feedback signal while tilting the magnetic head back to a position in a direction perpendicular to the intended direction of media travel, e.g., to perform readback operations. However, this embodiment is in no way intended to limit the invention. Additional configurations to perform read operations are described herein and may be combined with any desired environment and thus should be deemed to include any and all possible permutations.

In a preferred embodiment, magnetic tape systems have two or more modules, each having an array of transducers, typically in a row. Depending on the desired embodiment, additional arrays of transducers may allow the system to be bi-directional, but is not limited thereto. As mentioned above, the foregoing conventional challenges may be overcome, e.g., by rotating a given module about an axis orthogonal to the plane in which its array resides (e.g., parallel to the plane of the tape bearing surface), thereby selectively altering the orientation of the transducer arrays relative to each other and/or the data tracks of a tape. Thus, offset between transducer arrays may be compensated for by selectively orienting arrays of transducers. Moreover, write delays may be implemented to produce a desired orientation of data written to tape, as will be described in detail below.

Figure 10A:
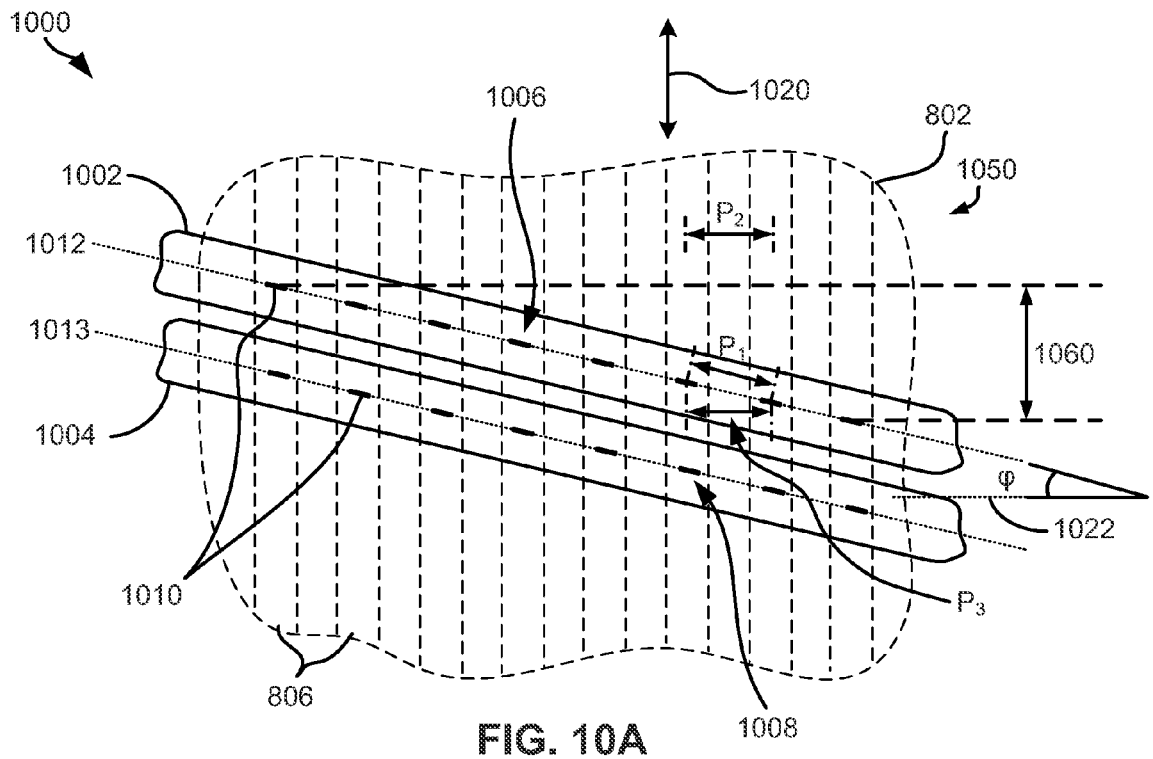
FIG. 10A is a partial top-down view of an apparatus with two modules according to one embodiment.
Figure 10B:
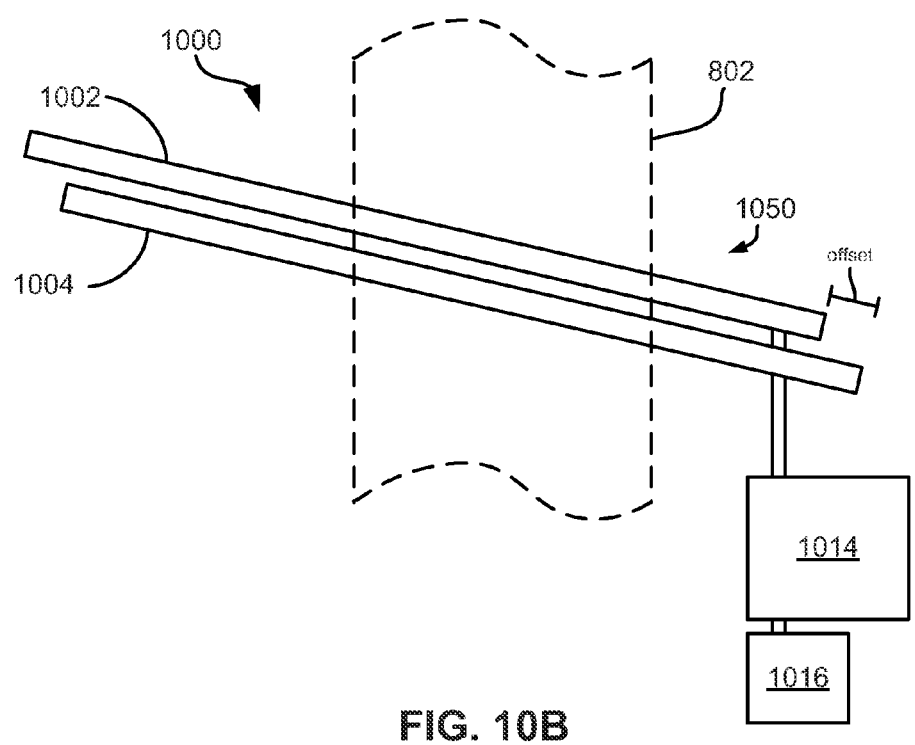
FIG. 10B is a diagram of the apparatus of FIG. 10A.

FIGS. 10A-10B depict an apparatus 1000 capable of compensating for offset between transducer arrays, in accordance with one embodiment. As an option, the present apparatus 1000 may be implemented in conjunction with features from any other embodiment listed herein, such as those described with reference to the other FIGS. Of course, however, apparatus 1000 and others presented herein may be used in various applications and/or in permutations which may or may not be specifically described in the illustrative embodiments listed herein. Further, the apparatus 1000 presented herein may be used in any desired environment.

Referring to FIGS. 10A-10B, the apparatus 1000 includes a magnetic head 1050 having two modules 1002, 1004, each of which have an array 1006, 1008 of transducers 1010. Although the magnetic head 1050 illustrated in FIGS. 10A-10B includes only two modules 1002, 1004, according to other embodiments, a system may include more than two modules, e.g., three modules, at least three modules (e.g., see FIG. 12), multiple modules, etc., depending on the desired embodiment. Furthermore, according to a preferred embodiment, each array 1006, 1008 may include at least one pair of servo transducers (e.g., see 212 of FIG. 2C).

With continued reference to FIGS. 10A-10B, the modules 1002, 1004, are preferably fixed relative to each other. In view of the present description, "fixed" is intended to mean constrained from a directional movement relative to each other such that the arrays of each maintain a fixed position relative to each other. According to various embodiments, the modules may be fixed relative to each other by using rods, fasteners, adhesives, cables, wire, etc. Moreover, according to different embodiments, the modules are preferably fixed relative to each other prior to being installed in the apparatus 1000, head, etc. depending on the desired embodiment. However, the modules are preferably selectively orientable (e.g., tiltable and/or rotatable) as a single structure about a pivot point while remaining fixed relative to each other, as will soon become apparent.

With continued reference to FIGS. 10A-10B, the modules 1002, 1004, are preferably fixed such that the axes 1012, 1013 of the arrays 1006, 1008 are oriented about parallel to each other, respectively. As illustrated in FIGS. 10A-10B, the longitudinal axes 1012, 1013 of each array of transducers are defined by the dashed lines that lie between opposite ends thereof, e.g., positioned farthest apart.

Referring now to FIG. 10A, the transducers 1010 of the array 1006 of a first module 1002 are aligned with the transducers 1010 of the array 1008 of a second module 1004 along the data tracks 806. This alignment is a result of the angular positioning of the modules 1002, 1004, which preferably align the transducers of the each of the arrays 1006, 1008 along the intended direction 1020 of tape travel, as will soon become apparent.

As previously mentioned, when a magnetic head is built, the transducer arrays therein may be undesirably offset in the direction perpendicular to the intended direction of tape travel, e.g., see Δ as shown in FIG. 8A. Referring still to FIG. 10A, according to some embodiments, this offset may be a result of the transducer arrays 1006, 1008 being positioned on their respective modules 1002, 1004 in an offset manner, while the modules 1002, 1004 themselves are not offset in the drive. However, according to other instances, the modules 1002, 1004 themselves may be misaligned thereby causing the offset of the transducer arrays 1006, 1008, e.g., similar to the offset (offset) in FIG. 10B. Yet in further situations, a combination of offset modules 1002, 1004 and the position of the transducer arrays 1006, 1008 along their axes may cause an offset between the transducers 1010 of the arrays 1006, 1008.

However, as mentioned above, the apparatus 1000 may orient the modules 1002, 1004 to a second position at an angle φ relative to the first position, e.g., using a mechanism and/or controller (see 1014, 1016 of FIG. 10B), preferably such that the transducers 1010 of the arrays 1006, 1008 are about aligned along the data tracks 806 on a tape 802, despite their offset in a first position (e.g., as seen in FIG. 8A) and/or different center to center pitches $P_1$, $P_2$. As depicted in FIG. 10A, the axes 1012, 1013 of the arrays 1006, 1008 are set to an angle φ in the drive so that the transducers of the arrays are also desirably aligned along the data tracks 806 on a tape 802, thereby desirably enabling the transducers to perform read while write verification.

It follows that the angle φ to which the axes 1012, 1013 of the arrays 1006, 1008 are tilted depends, at least in part, on the extent of the offset between the transducers of adjacent arrays, the offset being in a direction perpendicular to the intended direction 1020 of tape travel. However, according to preferred embodiments, the axes 1012, 1013 of the arrays 1006, 1008 may be oriented at an angle φ greater than about 0° and less than about 90°, relative to a line 1022 oriented perpendicular to the intended direction 1020 of tape travel. According to various other embodiments, the angle φ may preferably be greater than about 0.002° and less than about 0.01°, and ideally greater than about 0.002° and less than about 0.02°, but could be higher or lower. Moreover, the angle φ at which the axes 1012, 1013 of the arrays 1006, 1008 may be oriented is not limited to positive angles. It follows that, in some approaches, the angle φ may be less than about −0.002° and greater than about −0.01°, and ideally less than about −0.002° and greater than about −0.02°, but could be higher or lower. An effective range according to an illustrative embodiment, which is in no way intended to limit the invention may be at an angle in a range from about −1.5° to about 1.5°. Those skilled in the art will appreciate that the positive and negative angles are equivalents.

It is preferred that the transducer arrays 1006, 1008 are tilted to a low angle φ to facilitate the ability to tilt back to an angle φ of 0° (i.e., perpendicular to the intended direction of tape travel) when performing read operations. Tilting the arrays 1006, 1008 to a large angle φ, e.g., greater than about 0.02° or less than about −0.02°, may not only require an undesirable amount of time to tilt the transducer arrays 1006, 1008 back to an orientation perpendicular to the intended direction of tape travel, e.g., to perform read operations, but would also use an undesirable amount of power, computing resources, etc. Thus, in some approaches, a threshold may be implemented to limit the angle φ to which the transducer arrays 1006, 1008 may be tilted to. For example, the transducer arrays 1006, 1008 may be prevented from being tilted to an angle φ greater than about 0.02° and/or less than about −0.02+, but is in no way limited thereto.

It is preferred that the offset between transducer arrays be determined and compensated for prior to performing read and/or write operations. Therefore any offset between the transducers may be accounted for and write errors and readback errors may be reduced. However, as previously mentioned, the characteristics and/or dimensions of a tape may change during run time. For example, tape lateral expansion may cause the width of the tape in the crosstrack direction to increase, thereby causing the data tracks on the tape to expand as well. As a result, the transducers of the arrays would no longer be aligned with the data tracks on the tape if no additional adjustments were made.

It follows that, in some embodiments, the position at which the axes 1012, 1013 of the arrays 1006, 1008 are oriented may be selectable, and in some approaches continuously or periodically adjusted, based at least in part on any desirable factor. In one approach, the extent of the angular orientation of the axes 1012, 1013 may be made based on an extent of tape lateral expansion or contraction to compensate for a fluctuating width of the tape in the crosstrack direction. Thus, various embodiments described herein may be able to selectively adjust the position of the magnetic head (e.g., 1050) to compensate for tape lateral expansion, tape lateral contraction, tape skew, etc. Yet in further approaches, additional factors may be used to determine the angle of orientation of the axes 1012, 1013 may include detection of tape skew, direction of tape travel, etc.

In other embodiments, the head is not tilted to compensate for tape lateral expansion and/or contraction. Rather, the tilting is only to compensate for the offset between transducers of the adjacent arrays. Thus, in some approaches, the head is designed for reading and writing when the axes of the arrays are oriented perpendicular to the direction of tape travel thereacross, and the tilting is of a minor nature to merely align the readers of the trailing array with the writers of the leading array. Optionally, minor tilting may be performed to compensate for tape skew.

Where the head is pivoted to set its angle of orientation, the center of pivot of the head 1050 may extend through the module of the first or second array, or some point therebetween, with the head pivoting about an axis approximately orthogonal to the plane of the tape surface. For example, the pivot point may align with an intersection of the center of the first array 1006 and the axis 1012 of the first array. Moreover, the position of the modules may be adjusted using the actuator as necessary to position the active arrays over the appropriate tracks, e.g., based on servo or other signals.

In addition, the inventors have surprisingly and unexpectedly found that the various embodiments described below, and having the angle ϕ in the range between greater than about 0.2° and about 10°, enable writing and reading that does not notably steer the tape or cause media damage over the life of the tape. For example, the inventors expected that wrapping the tape over angled skiving edges would steer the tape laterally.

Angles of orientation greater than within the specified range (e.g., greater than about 10°) are undesirable as the higher angles cause steering of the tape when used. However, as described above, the angles of orientation within the specified range unexpectedly and unforeseeably did not result in steering of the tape. Moreover, it is more difficult to distinguish between tape lateral expansion and/or contraction and skew when angles of orientation of the modules is greater than within the specified range. This may cause difficulties when matching the dimensional conditions of the tape and/or orientation of the modules of the current operation to that of the previous operation (explained in further detail below). It should also be noted that the angle of orientation ϕ illustrated in FIG. 10A is exaggerated (e.g., larger than within the desired range), and is in no way intended to limit the invention.

In addition to offsetting the arrays 1006, 1008 of the transducers 1010, in some approaches the center to center pitch of the transducers may also be adjusted, depending on the desired embodiment. According to one approach, the center to center pitch of the transducers along the axes of the arrays may be greater than the center to center pitch of data tracks according to a given data storage format. Thus, with continued reference to FIG. 10A, the transducers 1010 of each array 1006, 1008 are illustrated as having a center to center pitch $P_1$ along the axes 1012, 1013 of the arrays 1006, 1008 that is greater than a center to center pitch $P_2$ of data tracks 806.

Thus, although the center to center pitch $P_1$ of the transducers 1010 along the axes 1012, 1013 is greater than the center to center pitch $P_2$ of data tracks 806, when the modules 1002, 1004 are positioned at about the angle ϕ, the center to center pitch $P_3$ of the transducers of the arrays as presented to the tape 802 preferably about matches the center to center pitch $P_2$ of the data tracks 806. Therefore, as illustrated in FIG. 10A, the transducers 1010 of each of the arrays 1006, 1008 lie between the edges of the data tracks 806 of the tape 802.

According to the present illustrative embodiment, the center to center pitch $P_3$ of the transducers as presented to the tape 802 is measured perpendicularly to the tape travel direction between imaginary parallel lines extending through the data transducers along the tape travel direction. Moreover, the center to center pitch $P_2$ of data tracks 806 is preferably measured in a direction perpendicular to the intended direction 1020 of tape travel, and may vary between different data storage formats.

Depending on the embodiment, the center to center pitch $P_2$ of data tracks 806 for a given tape may be specified by the format of the tape. Moreover, according to various embodiments, the format of the tape may specify reading, writing and/or servo following to access data stored in the data tracks of a tape, using a non-tilted head, e.g., having a transducer pitch that about matches the center to center pitch of the data tracks specified in the format. A format may also specify servo frames aligned with each other in a direction perpendicular to the intended direction 1020 of tape travel, for a non-tilted head.

For the present discussion, assume a legacy format specifies reading and/or writing using a non-tilted array of transducers, i.e., the array is oriented orthogonally to the direction of tape travel thereacross. Next, assume that one wishes to read and/or write in the legacy format, but using a tilted head, e.g., as depicted in FIGS. 10A-D.

As mentioned above the apparatus 1000 may position the axes 1012, 1013 of the arrays 1006, 1008 towards and/or at a second position having an angle ϕ to preferably overcome an offset between transducers of adjacent arrays 1006, 1008 as presented to the tape 802. Thus, the reading, writing and/or servo following specified by the format of the data tracks for a non-tilted head (e.g., oriented in a first position) is different than that of embodiments where the head may be tilted, thereby positioning the modules therein towards a second position.

In order to compensate for the positional offset (e.g., 1060 of FIG. 10A showing offset between outermost transducers) of the various transducers in a given array in the tape travel direction 1020, which is introduced by the tilting relative to orthogonal of the tape travel direction, and when reading or writing in a format specified for reading and/or writing with a non-tilted array, a controller (e.g., see 1016 of FIG. 10B) may be implemented to introduce a timing offset to compensate for the positional offset of the various transducers of the arrays 1006, 1008 introduced by the tilting. Moreover, it is preferred that the timing offset (e.g., delay) is based at least in part on the offset between the arrays 1006, 1008 of transducers in a direction orthogonal to an intended direction of media travel.

Note that the positional offset may be determined relative to some reference, such as one of the outermost transducers, a middle transducer, some point on the tape bearing surface, etc.

Any known method of introducing the timing offset(s) may be used, as would be understood by one skilled in the art upon reading the present disclosure. In one illustrative example, a system clock signal may be processed, e.g., with dividers and/or multipliers, to apply a timing offset to the signal processing (incoming and/or outgoing) in the channel corresponding to some or all of the transducers.

Looking now to FIG. 10B, according to one embodiment, the controller 1016 may be configured to introduce a timing offset to at least some of the write channels to enable writing of transitions that are readable by a non-tilted head compatible with the format. Furthermore, in yet another embodiment which is in no way intended to limit the invention, the controller may be configured to introduce a timing offset to at least some of the read channels to compensate for offset in readback signals introduced by a tilt of the magnetic head 1050. However, in preferred embodiments, the controller may be configured to tilt the magnetic head 1050 to a position in the direction perpendicular to the intended direction of media travel and read magnetic transitions on the tape 802 without implementing readback delays corresponding to the writing delays.

In another embodiment, the controller 1016 may be configured to introduce a timing offset to at least one of the servo channels to compensate for offset in servo readback signals introduced by positioning the modules 1002, 1004 at about the second position at the angle ϕ. In other words, as the modules are tilted, the orientation of the servo readers relative to the servo tracks is affected. As a result, this change in orientation of the servo readers may introduce timing discrepancies when reading the servo tracks on the tape. Thus, the controller 1016 may be used to compensate for this situation.

In a preferred embodiment, any of the controller operations (e.g., application of timing offsets) may be performed while reading data in a legacy data storage format. However, according to other embodiments, the controller may be able to operate in conjunction with any other desirable data storage format, for instance, a Linear Tape Open (LTO) generation format.

According to an additional embodiments, the controller 1016 may be configured to apply any of the offsets as described above, to at least one, at least some, a majority, all, etc., of the read channels, write channels and/or servo channels. As a result, the controller 1016 may preferably compensate for offsets in readback signals, which may be introduced by a tilt of the modules 1002, 1004. Furthermore, the controller 1016 may also enable writing of transitions that are readable by a non-tilted head compatible with the format.

Thus, according some embodiments, the controller may be configured to read data from and/or write data to a tape corresponding to a second format, e.g., that specifies reading, writing and/or servo following, using a head oriented at about the angle ϕ. As described above, the controller 1016 may be able to achieve this functionality in some embodiments by introducing a timing offset when reading and/or writing data in the second format.

Moreover, controller 1016 of FIG. 10B may perform any one or more of the operations described above in method 900 of FIG. 9, depending on the desired embodiment.

Figure 11:
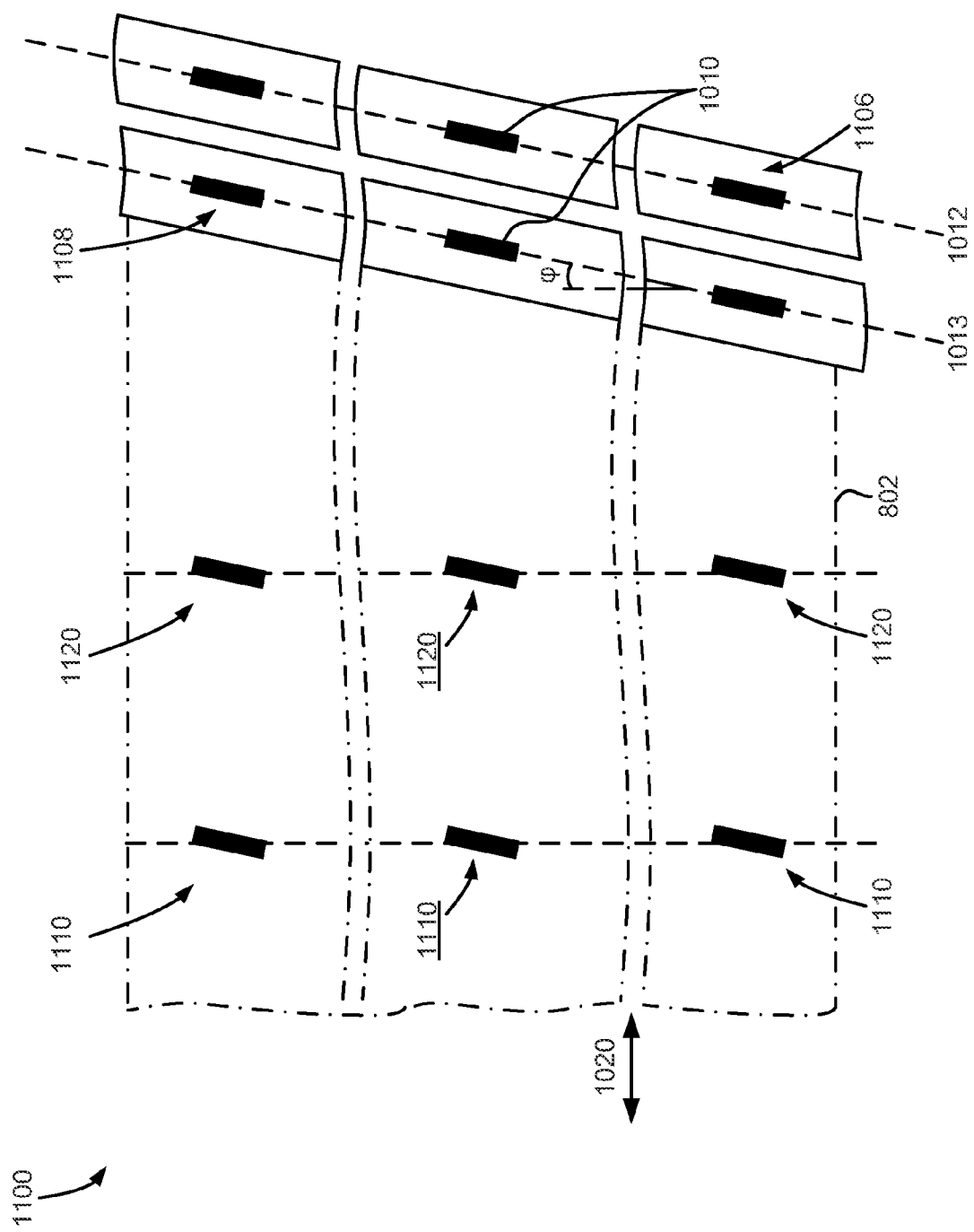
FIG. 11 is a partial media-facing surface view of an apparatus having a magnetic head according to one embodiment.

According to an example, which is in no way intended to limit the invention, looking to the apparatus 1100 of FIG. 11, although the axes 1012, 1013 of the arrays 1106, 1108 are shown as being oriented at an exemplary second position, and thus the outer transducers in each array are offset from each other in the intended direction 1020 of tape travel, the timing of operation of the transducers 1010 of the arrays 1106, 1108 may be offset.

Thus, according to one embodiment, transducers 1010 of the first and second arrays 1106, 1108 may include readers and/or writers, e.g., of a type known in the art. By offsetting the operation of the transducers 1010, corresponding data transitions 1110, 1110 and 1120, 1120 respectively, written to the tape may align substantially in a direction orthogonal to the intended direction 1020 of tape travel, e.g., corresponding with a format. Therefore, although the axes 1012, 1013 of the arrays 1106, 1108 may be oriented at about a second position at an angle ϕ, corresponding data transitions 1110, 1110 and 1120, 1120 respectively, may be aligned in the crosstrack direction, and optionally read back using a head that has non-tilted arrays. In a similar fashion, the timing of operation of the transducers 1010 may be offset such that the transducers of the tilted arrays may read the data transitions 1110, 1110 and 1120, 1120 oriented about perpendicular to the intended direction 1020 of tape travel, e.g., corresponding with a format.

According to different embodiments, the offset of the timing of the transducers 1010 may be set and/or adjusted according to various parameters, such as the velocity of the tape, the spacing between each written data frame, the angular position of the modules, the amount of data in each data frame, etc. Moreover, a particular data storage format may specify timing offsets which may be implemented by the controller 1016 depending on the desired embodiment. Moreover, it should be noted that the offsets in the timing of operation of the transducers 1010 illustrated in FIG. 11 may be implemented in any of the embodiments described and/or suggested herein.

Referring again to FIG. 10B, the apparatus 1000 includes a mechanism 1014, such as a tape dimensional instability compensation mechanism, for orienting the modules to control a transducer pitch presented to a tape. The tape dimensional instability compensation mechanism 1014 preferably allows for the orienting of the modules to be performed while the modules are reading and/or writing. The tape dimensional instability compensation mechanism 1014 may be any known mechanism suitable for orienting the modules. Illustrative tape dimensional instability compensation mechanisms 1014 include worm screws, voice coil actuators, thermal actuators, piezoelectric actuators, etc.

Moreover, according to one embodiment, the controller 1016 may be configured to control the mechanism 1014 based on a readback signal of the tape, e.g., servo signals, data signals, a combination of both, etc. which may be gathered during read while write verification. However, in yet another embodiment, the controller 1016 may be configured to control the mechanism 1014 for orienting the modules 1002, 1004 based on a state of tape dimensional instability, e.g., tape skew, tape lateral contraction, tape lateral expansion, etc., but is not limited thereto.

According to some embodiments, the dimensional conditions of the tape, the offset between transducers of adjacent transducer arrays in a direction perpendicular to the intended direction of tape travel, and/or orientation of the modules when the tape was written may be retrieved e.g., from a database, cartridge memory, etc., and the orientation may be set based thereon to about match the transducer pitch of the current operation to that of the previous operation.

In various embodiments, additional logic, computer code, commands, etc., or combinations thereof, may be used to control the tape dimensional instability compensation mechanism 1014 for adjusting the orientation of the modules based on, for instance, a skew of the tape. Moreover, any of the embodiments described and/or suggested herein may be combined with various functional methods, depending on the desired embodiment.

Figure 10C:
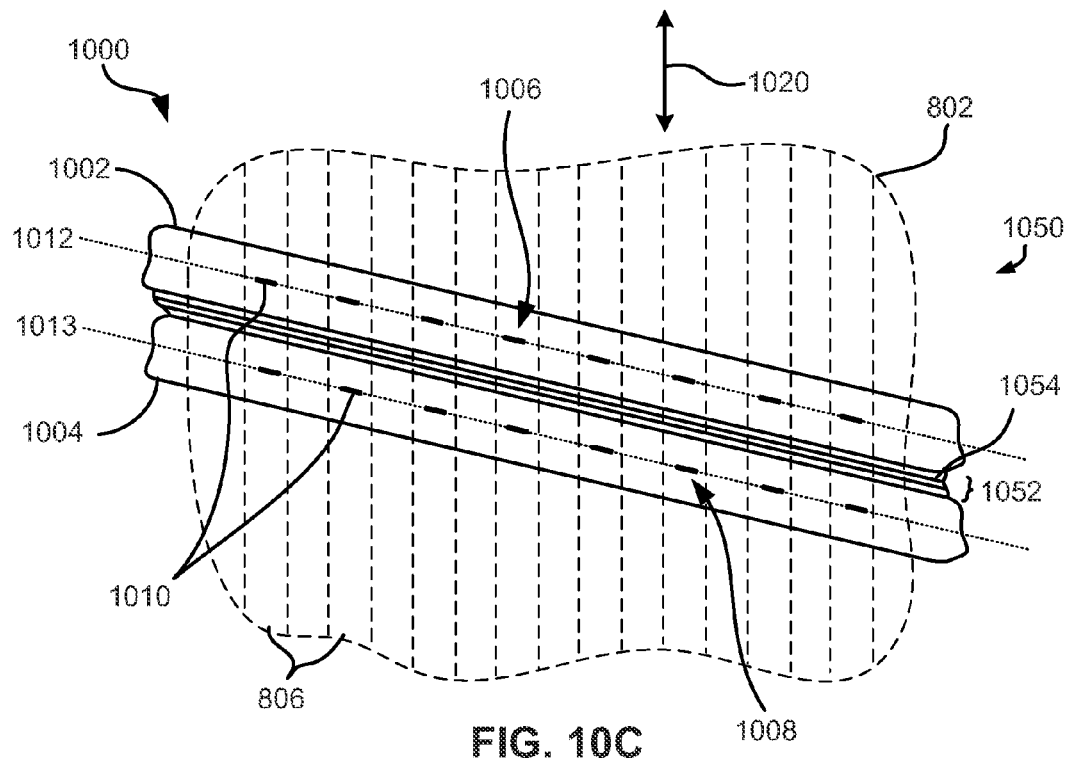
FIG. 10C is a partial top-down view of an apparatus with two modules according to one embodiment.

FIG. 10C depicts a variation of the apparatus 1000 as shown in FIG. 10A, and like elements are numbered the same in both FIGS. Referring to FIG. 10C, a spacer member 1052 extends between tape bearing surfaces of the modules. The spacer member 1052 may be recessed from a plane of the tape bearing surfaces, but is preferably coplanar therewith and/or otherwise forms a portion of the overall tape bearing surface of the head 1050.

In one embodiment, the spacer member 1052 includes a magnetic shield 1054 for magnetically shielding the array of transducers from the second array of transducers. Such magnetic shield may be formed of any suitable material known in the art, such as NiFe, CoFe, etc. The magnetic shield may extend from the tape bearing surface, or some point therebelow, in a height direction (into the tape bearing surface), preferably for a distance that provides the desired shielding effect. For example, the shield may have a height similar to that of shields of the transducers.

Figure 10D:
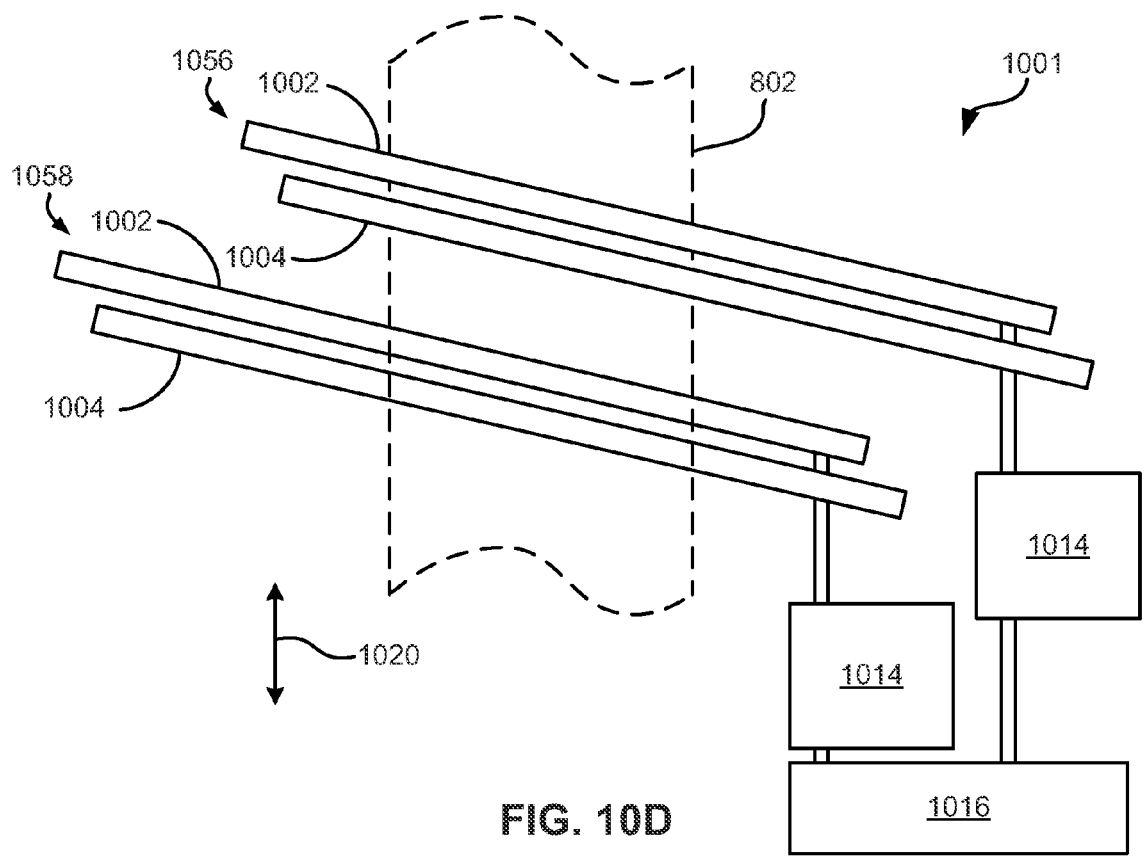
FIG. 10D is a diagram of an apparatus having multiple sets of modules according to one embodiment.

FIG. 10D depicts an alternate embodiment, similar to that of the apparatus 1000 of FIG. 10B, and like elements are numbered the same in both FIGS. Referring to FIG. 10D, the apparatus 1001 has two sets 1056, 1058 of modules 1002, 1004, where each set may include two or more modules. Each set 1056, 1058 of modules 1002, 1004 is preferably independently orientable to set the angle of orientation thereof, and may include any of the embodiments described herein. Each set may also be independently positionable, e.g., to assist with track following.

According to an illustrative embodiment, which is in no way intended to limit the invention, the outer modules of each set may be configured for writing, and the inner modules may be configured for reading. Thus, the modules 1002, 1004 of each of the sets 1056, 1058 may preferably include transducers (e.g., see 1010 of FIG. 10A), where the transducers of the outer modules may be writers and the transducers of the inner modules may be readers. In one illustrative use case, the writers on the outer module of one set may write while the readers of an inner module of the second set may read back the just-written track. In another illustrative use case, the writers on the outer module of one set may write while the readers of an inner module of the same set may read back the just-written track.

According to an exemplary embodiment, which is in no way intended to limit the invention, a method may be used to orient the modules according to any of the embodiments described herein, e.g., to overcome a manufacturing offset between transducers of adjacent arrays in the direction perpendicular to the intended direction of tape travel 1020. According to one embodiment, such method may be implemented by the controller 1016 of FIGS. 10B and/or 10D. As an option, the present method may be implemented in conjunction with features from any other embodiment listed herein, such as those described with reference to the other FIGS. Of course, however, such method and others presented herein may be used in various applications and/or in permutations which may or may not be specifically described in the illustrative embodiments listed herein. Further, the method presented herein may be used in any desired environment.

With continued reference to the exemplary embodiment, the method may include performing any one or more of the operations in method 900. In one embodiment, the offset between transducers of adjacent arrays may be determined by the state of the drive. An exemplary mechanism for establishing the proper tilting angle to compensate for such an offset is to use the timing interval read by two servo readers during a test read operation to determine the state of the drive. Although one mode includes using servo data, this is not absolutely required. Thus, it may be desirable to determine the state of the transducer alignment, e.g., by incorporating any of the embodiments described and/or suggested herein and/or known processes, when determining the tilting angle. However, according to other embodiments, the tilt angle may be determined using any embodiment described and/or suggested herein, or combinations thereof.

The method further includes orienting a head to achieve the desired transducer alignment, the head having at least two opposing modules generally aligned with each other in a (n intended) direction of tape travel thereacross, positions of the two modules being fixed relative to each other, each module having an array of the transducers, where an axis of each array is defined between opposite ends thereof, where the transducers of the first module are about aligned with the transducers of the second module in a direction of tape travel thereacross when the axes are oriented at an angle between greater than 0.2° and about 10° relative to a line oriented perpendicular to the intended direction of tape travel.

In further embodiments, any of the steps of the method described above may be performed concurrently. For example, in one embodiment the proper tilt angle may be based on data signals. One way to implement this is by first setting the transducer alignment in the intended direction of tape travel to a nominal orientation by selecting an arbitrary second position, and then adjusting the orientation thereof to obtain a better readback quality across the read channels. The quality may be determined for example by finding the lowest error rate, best signal to noise level, etc.

As an option, the system may continue or periodically monitor the appropriate signals and adjust the orientation. Adjustments can be performed any time, such as during an initialization period prior to reading or writing user data, during readback or writing operations, etc.

As alluded to above, although two modules 1002, 1004 are illustrated in FIGS. 10A-10D, in other embodiments, an apparatus may include any number of modules e.g., at least two, at least three, at least four, a plurality, etc. depending on the desired embodiment. Referring to the illustrative embodiment depicted in FIG. 12, which may be considered a modification of the apparatus 1000 of FIG. 10A, the apparatus 1200 shown may include a magnetic head 1250 having a third module 1202 positioned beside the first and second modules 1002, 1004. As illustrated, the array 1208 of transducers of the third module 1202 may be offset from the array 1006 of the first module 1002 in a first direction 1204. Moreover, the extent of the offset $t_1$ of the array of the third module 1202 relative to the array of the first module 1002 is illustrated in the present embodiment as being different than an extent of the offset $t_2$ of the array of the second module 1004 relative to the array of the first module 1002. However, according to other embodiments, offset $t_1$ may be about the same as offset $t_2$, e.g., depending on the outcome of the manufacturing process used to form the arrays of transducers.

According to different embodiments, the first, second and/or third modules 1002, 1004, 1202 may be used for data writing and/or data reading, depending on the desired embodiment. Thus, the apparatus 1200 may serve as a write-read-write (WRW) device if the third and second modules 1202, 1004 are designed for at least data writing and the first module 1002 is designed for at least data reading. As an option, the third and second modules 1202, 1004 may be designed for data writing and not for data reading, and/or the first module 1002 maybe designed for data reading and not for data writing.

In another embodiment, the apparatus 1200 may serve as a read-write-read (RWR) device if the third and second modules 1202, 1004 are designed for at least data reading and optionally not for data writing, while the first module 1002 is designed for at least data writing and optionally not for data reading. However, this is in no way meant to limit the invention; according to various other embodiments, a third, fourth, fifth, etc. module may be positioned with any orientation relative to other modules of the apparatus, depending on the desired embodiment.

With continued reference to FIG. 12, according to one embodiment, the angle of orientation ϕ of the modules 1002, 1202, 1004 and distance y between the arrays may be used to calculate the offset x. As illustrated, the offset x is between the arrays of transducers of the modules in a direction parallel to their axes 1012, 1206, which may be calculated using Equation 1.

$$\tan(\phi) = x/y \quad \text{Equation 1}$$

Equation 1 can be rewritten into Equation 2.

$$\phi = \arctan(x/y) \quad \text{Equation 2}$$

Figure 15:
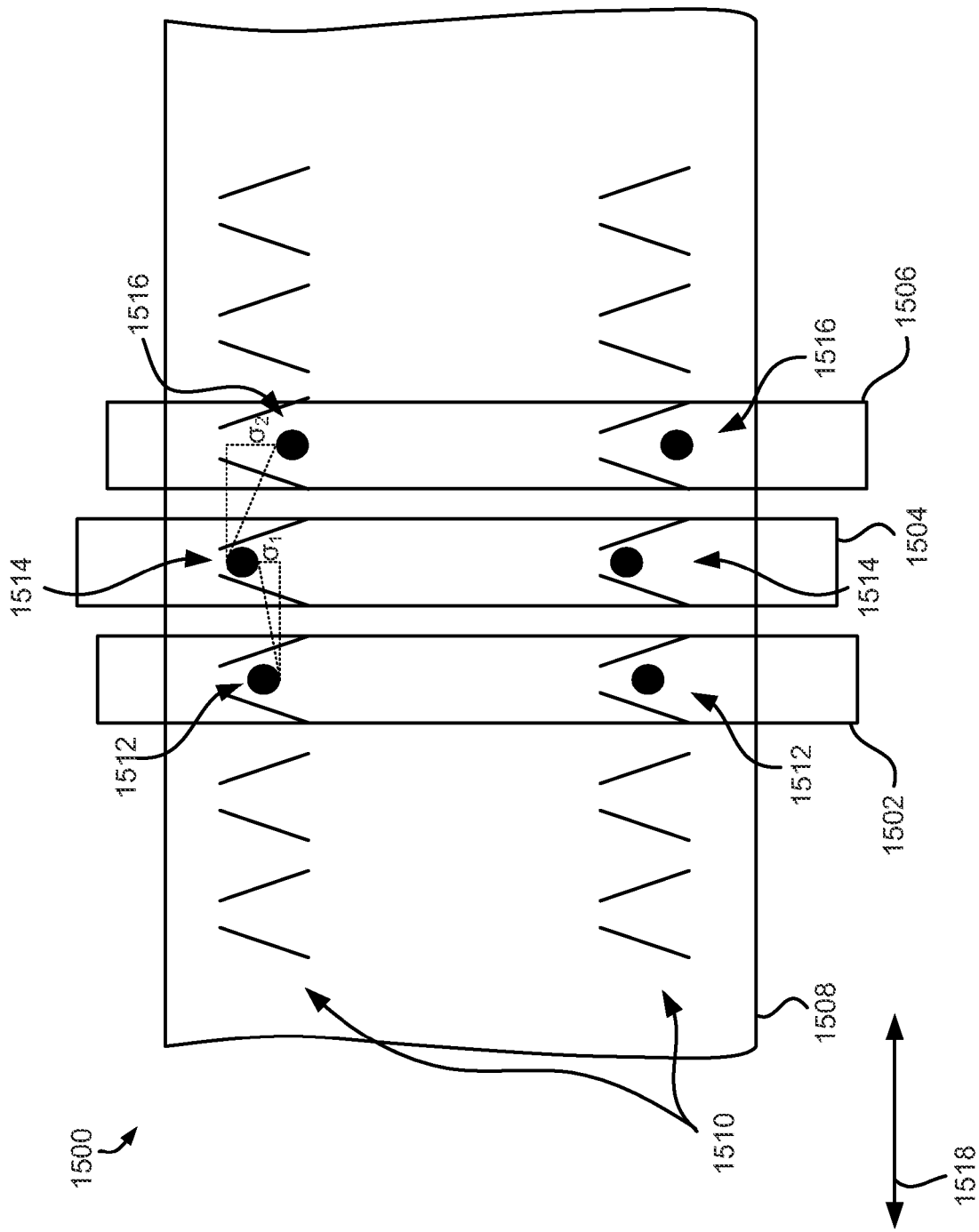
FIG. 15 is a partial top-down view of a system according to one embodiment.

Other known methods of calculating and/or assigning the offset x and distance y between the arrays of any of the modules may be used in other embodiments, e.g., see FIG. 15.

Depending on the intended direction of tape travel and the desired operation to be performed (e.g., reading or writing), the first, second, and third modules 1002, 1004, 1202 may be tilted towards a first, second or third position. As previously mentioned above, it may be desirable to determine an offset between first and second arrays 1006, 1008 of transducers in addition to an offset between the third array 1208 and at least one of the first and second arrays 1006, 1008 of transducers, e.g., when the magnetic head is positioned in the first direction 1204 which may be oriented perpendicular to an intended direction of tape travel 1210. For example, an offset between the transducers 1010 of the first and second arrays 1006, 1008 may be compensated for when the first and second arrays 1006, 1008 of transducers are being used to read and/or write. On the other hand, an offset between the transducers 1010 of the first and third arrays 1006, 1208 may be compensated for when the first and third arrays 1006, 1208 of transducers are being used to read and/or write.

For example, different pairs of transducer arrays may be used to conduct serpentine and non-serpentine writing. Looking to FIGS. 13A-13C, diagrams 1300, 1310, 1320 of a tape having tracks written using different writing configurations are illustrated. As an option, the present diagrams 1300, 1310, 1320 may be implemented in conjunction with features from any other embodiment listed herein, such as those described with reference to the other FIGS. Of course, however, such diagrams 1300, 1310, 1320 and others presented herein may be used in various applications and/or in permutations which may or may not be specifically described in the illustrative embodiments listed herein. Further, the diagrams 1300, 1310, 1320 presented herein may be used in any desired environment. Thus FIGS. 13A-13C (and the other FIGS.) should be deemed to include any and all possible permutations.

Depending on the configuration of the transducers in a given module, one method of writing shingled data tracks may be preferred over the other. For example, it is preferred that modules having a RWR transducer configuration conduct non-serpentine writing. This is primarily because a RWR transducer configuration allows the same writer array to write each adjoining data track, despite reversal of the tape direction and/or orientation of the transducer while writing thereto. This may reduce writing errors, readback errors, data loss, etc., as well as reducing the misregistration budgeting requirements, as only one set of track tolerances comes into play. Moreover, using the same writer array to write adjoining data tracks ensures consistency while writing (e.g., by enabling symmetrical servo pattern reading), overall higher areal density, etc.

Figure 13A:
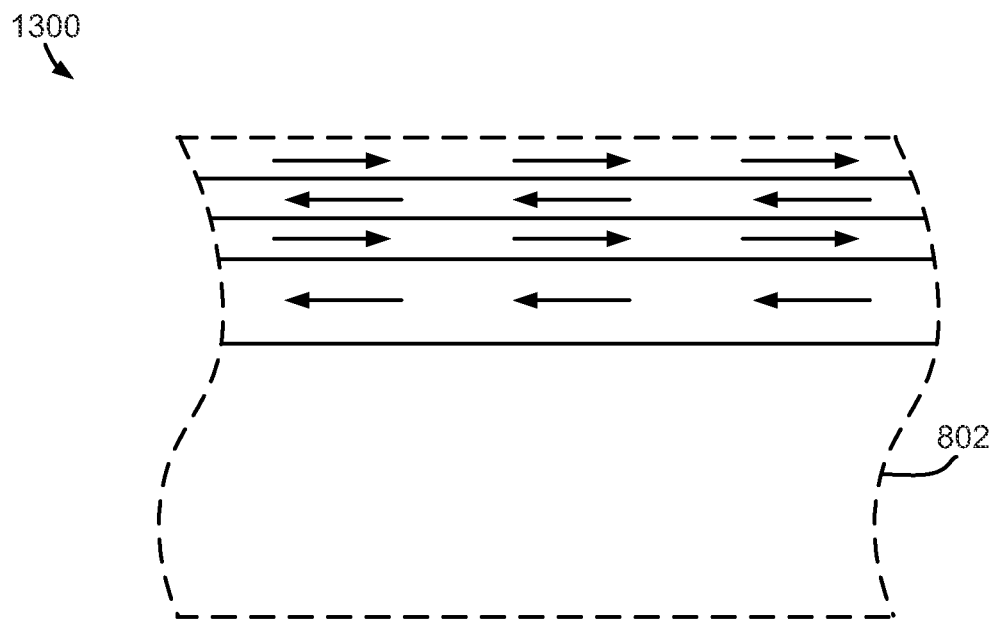
FIG. 13A is a diagram of a tape with shingled tracks written in a non-serpentine fashion according to one embodiment.

Thus, as illustrated in the representational diagram of FIG. 13A, which is in no way intended to limit the invention, the orientation of the arrows in each of the tracks are intended to represent the direction of tape travel when the corresponding track was written to the tape 802.

Note that, while not ideal, a WRW transducer configuration may be used for non-serpentine writing in some embodiments. In such embodiments, it is preferable that, while writing data to adjoining data tracks, especially shingled data tracks, the same writer array is used for the adjoining data tracks. Moreover, similar to the description presented immediately above, different writer arrays are not typically identical, as they have different alignment characteristics, and therefore write data differently. For example, the write transducers of one writer array may not have the same pitch, spacing, etc. as the write transducers of another writer array. Thus, using multiple writer arrays to write data to adjoining data tracks may result in readback errors, as the data written to the tracks may be aligned differently on each pass. According to another example, using different writer arrays may result in overwriting data on an adjoining track, thereby causing data loss.

However, according to another illustrative embodiment, a module may have a WRW transducer configuration, which is a preferable configuration with which to conduct serpentine writing. While writing data with a WRW configuration, the leading writer and reader are preferably active, while the trailing writer is not active, depending on the intended direction of tape travel. As a result, the leading writer array may be used to write adjoining data tracks for a first direction of tape travel, while the trailing writer array may be used to write adjoining data tracks for a second direction of tape travel opposite the first direction.

Figure 13B:
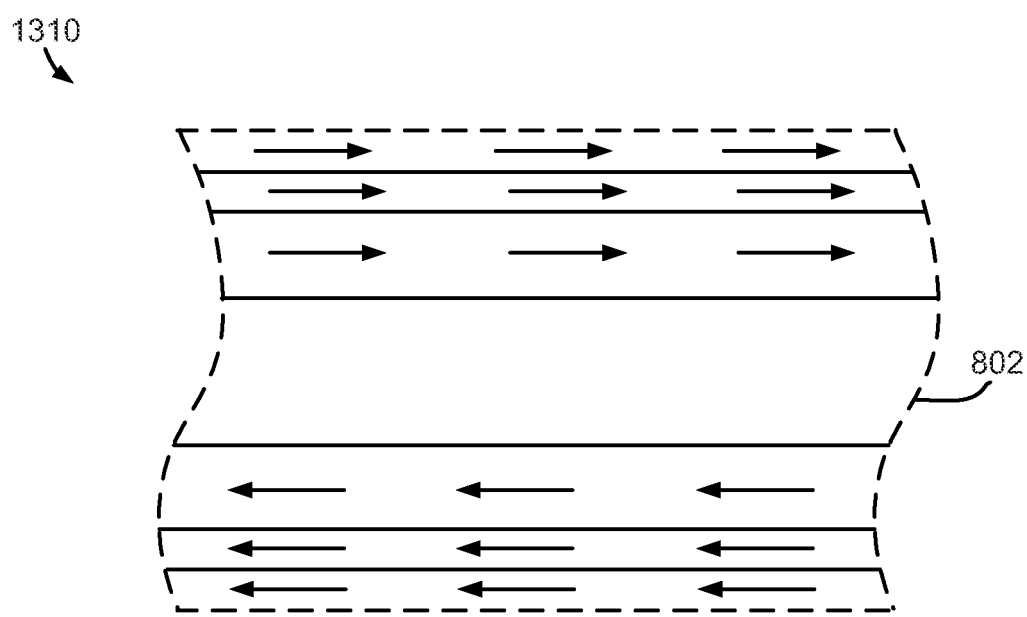
FIG. 13B is a diagram of a tape with shingled tracks written in a serpentine fashion according to one embodiment.
Figure 13C:
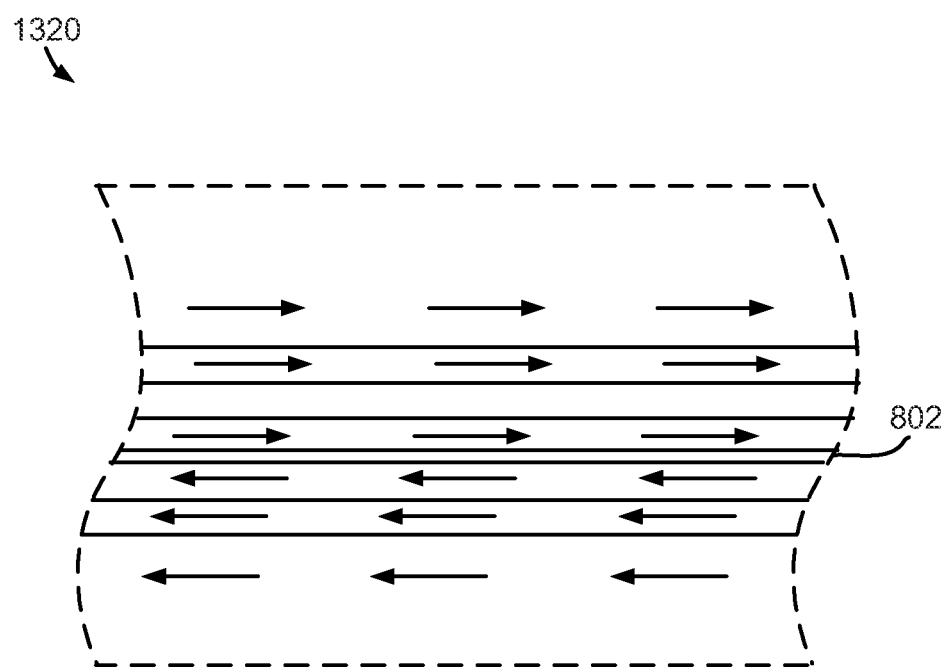
FIG. 13C is a diagram of a tape with shingled tracks written in a center-out serpentine fashion according to one embodiment.

Thus, as illustrated in the representational diagram of FIG. 13B, which is in no way intended to limit the invention, the orientation of the arrows in each of the tracks are intended to represent the direction of tape travel when the corresponding track was written to the tape 802. In contrast to the diagram of FIG. 13A, here data tracks corresponding to a first direction of tape travel are written to the top portion of a data partition, while data tracks corresponding to a second direction of tape travel are written to the bottom portion of the data partition. This preferably reduces writing errors, readback errors, data loss, etc. and ensures consistency while writing, e.g., by enabling symmetrical servo pattern reading.

Furthermore, FIG. 10C depicts a center-out serpentine writing pattern which may be implemented according to the desired embodiment.

Figure 14:
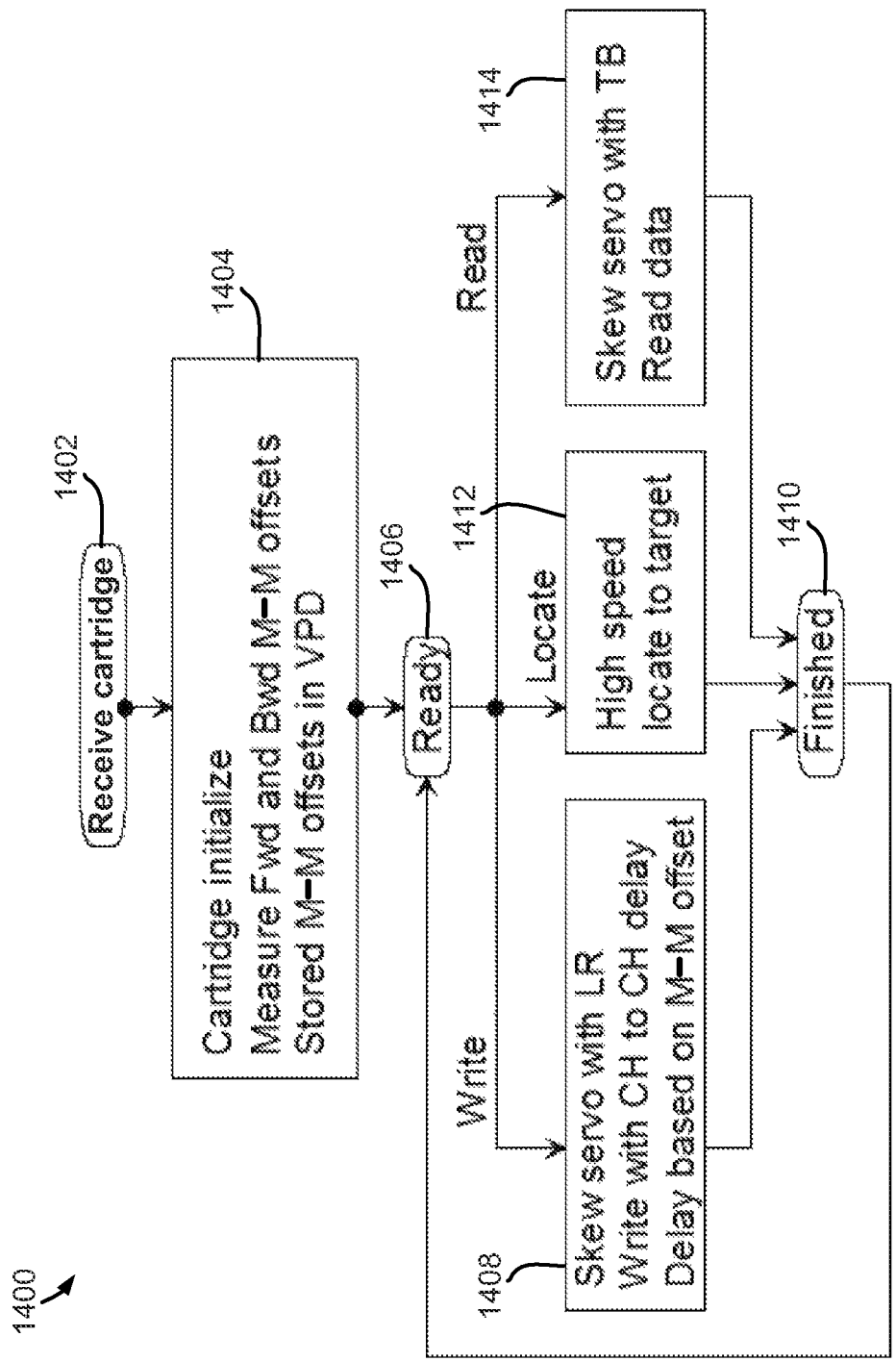
FIG. 14 is a flowchart of a method according to one embodiment.

According to an exemplary embodiment, which is in no way intended to limit the invention, FIG. 14 illustrates a flowchart according to a method 1400, in accordance with one embodiment. As an option, the present method 1400 may be implemented in conjunction with features from any other embodiment listed herein, such as those described with reference to the other FIGS., particularly those having three transducer arrays such as in FIG. 12. Of course, however, such method 1400 and others presented herein may be used in various applications and/or in permutations which may or may not be specifically described in the illustrative embodiments listed herein. Further, the method 1400 presented herein may be used in any desired environment. Thus FIG. 14 (and the other FIGS.) should be deemed to include any and all possible permutations.

Looking to FIG. 14, operation 1402 of method 1400 includes receiving a cartridge, while operation 1404 includes initializing the cartridge. Moreover, operation 1404 includes measuring (e.g., calculating) the module-to-module (M-M) offset between arrays of transducers and storing the offset, e.g., in vital product data (VPD) in memory. VPD may include data of particular importance relating to physical and/or operating characteristics of the particular drive, as would be appreciated by one skilled in the art upon reading the present description.

The M-M offset is preferably measured between a representative pair of adjacent transducers, e.g., using Equations 1 and/or 2 above. Moreover, depending on the number of transducer arrays included in a given embodiment, measuring the M-M offset may include making a different number of measurements. For example, an embodiment having only two arrays of transducers (e.g., see FIG. 8A) may include measuring the M-M offset between the two arrays. However, for an embodiment having three arrays of transducers (e.g., see FIG. 12), operation 1404 would include measuring the M-M offset between a first and second array, in addition to measuring the M-M offset between the second and a third array. It should also be noted that the M-M offset is preferably measured in a direction perpendicular to the intended direction of tape travel.

Referring still to FIG. 14, after performing operation 1404, method 1400 enters a "ready" state 1406 whereby, based on the action to be performed, method 1400 may follow any one of three different operation paths. If a write operation is to be performed, method 1400 follows the Write path whereby operation 1408 is performed. Operation 1408 includes skewing the head to an angle relative to a direction perpendicular to the intended direction of tape travel to compensate for misalignment between transducers about aligned in the intended direction of tape travel, and performing delayed write operations based at least in part on the M-M offset, e.g., using any of the approached described and/or suggested herein. Thereafter, method 1400 reaches a finished state 1410, e.g., signaling that the write operation has been completed, and returns to the ready state 1406 to perform subsequent operation requests.

Looking again to the ready state 1406, if a locate operation is to be performed, method 1400 follows the Locate path whereby operation 1412 is performed which includes performing a high speed locate to a target location on a tape. For example, the Locate request may include locating the end of written data on a given tape such that subsequent write operations may be made to the remaining unwritten portion of the tape. Again, after the Locate operation 1412 has been completed, method 1400 reaches a finished state 1410, e.g., signaling that the Locate operation has been completed, and returns to the ready state 1406 to perform subsequent operation requests.

Looking yet again to the ready state 1406, if a read operation is to be performed, method 1400 follows the Read path whereby operation 1414 is performed which includes skewing (e.g., tilting) the head such that it is oriented in the direction perpendicular to the intended direction of tape travel and performing read operations on tape. Once again, after the Read operation 1414 has been completed, method 1400 reaches a finished state 1410, e.g., signaling that the Read operation has been completed, and returns to the ready state 1406 to perform subsequent operation requests.

FIG. 15 depicts a system 1500 illustrating one method of measuring an offset between adjacent transducer arrays, in accordance with one embodiment. As an option, the present system 1500 may be implemented in conjunction with features from any other embodiment listed herein, such as those described with reference to the other FIGS. Of course, however, such system 1500 and others presented herein may be used in various applications and/or in permutations which may or may not be specifically described in the illustrative embodiments listed herein. Further, the system 1500 presented herein may be used in any desired environment. Thus FIG. 15 (and the other FIGS.) should be deemed to include any and all possible permutations.

Referring now to FIG. 15, system 1500 includes three modules 1502, 1504, 1506 positioned above a tape 1508 having servo tracks 1510. Moreover, servo reader pairs 1512, 1514, 1516 are positioned at about the servo tracks 1510, e.g., to read the transitions thereof. Although it is desired that the servo reader pairs 1512, 1514, 1516 are about aligned in the intended direction 1518 of tape travel, looking to modules 1502, 1504, 1506, it is apparent that adjacent servo reader pairs 1512, 1514 and 1514, 1516 are offset in a direction perpendicular to the intended direction 1518 of tape travel. Offsets $\sigma_1$, $\sigma_2$ may be calculated using Equation 1 and/or Equation 2 described above. However, according to another approach, system 1500 may use the data read from the servo tracks 1510 by the servo reader pairs 1512, 1514, 1516 to determine the offsets $\sigma_1$, $\sigma_2$. According to an example, which is in no way intended to limit the invention, the servo reader pairs 1512, 1514, 1516 may use the chevron pattern of the servo tracks 1510 to determine the offsets $\sigma_1$, $\sigma_2$ as would be appreciated by one skilled in the art upon reading the present description. Thus, the offsets $\sigma_1$, $\sigma_2$ may be determined by simply processing data read from the servo tracks 1510. Additional embodiments and supplemental descriptions for calculating the offsets are presented in U.S. Patent Publication No. US-2014-0016226-A1 which is herein incorporated by reference.

It will be clear that the various features of the foregoing systems, apparatuses and/or methodologies may be combined in any way, creating a plurality of combinations from the descriptions presented above.

As will be appreciated by one skilled in the art, aspects of the present invention may be embodied as a system, apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," "apparatus", or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (e.g., CD-ROM), a Blu-ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fibre, etc.

Program code embodied on a computer readable medium may be transmitted using any appropriate medium, including but not limited to wireless, wireline, optical fibre cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer, for example through the Internet using an Internet Service Provider (ISP).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart(s) and/or block diagram block or blocks.

It will be further appreciated that embodiments of the present invention may be provided in the form of a service deployed on behalf of a customer.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method, comprising:
    determining an offset between first and second arrays of transducers on a magnetic head in a direction perpendicular to an intended direction of media travel when the magnetic head is positioned at a first position;
    tilting the magnetic head to a second position selected based at least in part on the offset;
    wherein at least one of the arrays of transducers includes write transducers;
    wherein the arrays of transducers have longitudinal axes aligned at the second position greater or less than 0 degrees from the longitudinal axes of the arrays of transducers aligned at the first position; and
    delaying writing by at least some of the write transducers to provide magnetic transitions on a magnetic medium as if the longitudinal axis of the array was aligned in the direction perpendicular to the intended direction of media travel.

2. A method as recited in claim 1, wherein the magnetic transitions are readable by an array of read transducers aligned in the direction orthogonal to the intended direction of media travel without implementing readback delays corresponding to the writing delays.

3. A method as recited in claim 1, wherein one of the arrays includes read transducers, the array having a longitudinal axis aligned about parallel to the longitudinal axis of the array of write transducers.

4. A method as recited in claim 1, wherein the writing delays are based at least in part on an offset between the arrays of transducers in the direction perpendicular to the intended direction of media travel.

5. A method as recited in claim 1, further comprising:
    tilting the magnetic head to a position in the direction perpendicular to the intended direction of media travel; and
    reading magnetic transitions on a magnetic medium.

6. A method as recited in claim 1, wherein the first position is perpendicular to the intended direction of media travel.

7. A method as recited in claim 1, further comprising:
    determining an offset between the second array and a third array of transducers on the magnetic head in the direction perpendicular to the intended direction of media travel when the magnetic head is positioned at the first position.

8. A method as recited in claim 1, further comprising:
    selectively adjusting the position of the magnetic head to compensate for at least one of tape lateral expansion/contraction and tape skew.

9. An apparatus, comprising:
    a magnetic head having at least two modules, each of the modules having an array of transducers,
    wherein a longitudinal axis of each of the arrays are oriented about parallel to each other; and
    a controller configured to:
        determine an offset between adjacent ones of the arrays of transducers in a direction perpendicular to an intended direction of media travel when the magnetic head is positioned at a first position;
        tilt the magnetic head to a second position selected based at least in part on the offset; and
        delay write operations performed by at least some of the transducers in an array of a first of the modules such that data written by the transducers in the array of the first of the modules is readable by an array of read transducers aligned in the direction orthogonal to the intended direction of media travel without implementing readback delays corresponding to the write delays,
    wherein the delay is based at least in part on an offset between the arrays of transducers in a direction orthogonal to an intended direction of media travel.

10. An apparatus as recited in claim 9, wherein one of the arrays includes read transducers, the array having a longitudinal axis aligned about parallel to the longitudinal axis of the array of the first of the modules.

11. An apparatus as recited in claim 9, wherein the controller is further configured to: tilt the magnetic head to a position in the direction perpendicular to the intended direction of media travel; and read magnetic transitions on a magnetic medium.

12. An apparatus as recited in claim 9, wherein the first position is perpendicular to the intended direction of media travel.

13. An apparatus as recited in claim 9, wherein the magnetic head includes three modules.

14. An apparatus as recited in claim 9, wherein the controller is further configured to: selectively adjust the position of the magnetic head to compensate for at least one of tape lateral expansion/contraction and tape skew.

15. An apparatus as recited in claim 9, further comprising:
   a drive mechanism for passing a magnetic medium over the head; and
   a controller electrically coupled to the head.

16. A non-transitory computer program product comprising a computer readable storage medium having program instructions embodied therewith, the program instructions readable and/or executable by a drive to cause the drive to:
   determine, by the drive, an offset between first and second arrays of transducers on a magnetic head in a direction perpendicular to an intended direction of media travel when the magnetic head is positioned at a first position;
   tilt, by the drive, the magnetic head to a second position selected based at least in part on the offset;
   wherein at least one of the arrays of transducers includes write transducers;
   wherein the arrays of transducers have longitudinal axes aligned at the second position greater or less than 0 degrees from the longitudinal axes of the arrays of transducers aligned at the first position; and
   delay, by the drive, writing by at least some of the write transducers to provide magnetic transitions on a magnetic medium as if the longitudinal axis of the array was aligned in the direction perpendicular to the intended direction of media travel.

17. The computer program product of claim 16, wherein the magnetic transitions are readable by an array of read transducers aligned in the direction orthogonal to the intended direction of media travel without implementing readback delays corresponding to the writing delays.

18. The computer program product of claim 16, wherein the writing delays are based at least in part on an offset between the arrays of transducers in the direction perpendicular to the intended direction of media travel.

19. The computer program product of claim 16, wherein the program instructions are further readable and/or executable by the drive to:
   tilt, by the drive, the magnetic head to a position in the direction perpendicular to the intended direction of media travel; and
   read, by the drive, magnetic transitions on a magnetic medium.

20. The computer program product of claim 16, wherein the program instructions are further readable and/or executable by the drive to:
   selectively adjust, by the drive, the position of the magnetic head to compensate for at least one of tape lateral expansion/contraction and tape skew.

* * * * *